United States Patent
Cotton

(10) Patent No.: US 11,562,382 B2
(45) Date of Patent: Jan. 24, 2023

(54) SYSTEM AND METHOD FOR PROVIDING DATA SCIENCE AS A SERVICE

(71) Applicant: JPMorgan Chase Bank, N.A., New York, NY (US)

(72) Inventor: Peter Cotton, Darien, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 175 days.

(21) Appl. No.: 16/172,212

(22) Filed: Oct. 26, 2018

(65) Prior Publication Data

US 2019/0066133 A1 Feb. 28, 2019

Related U.S. Application Data

(63) Continuation-in-part of application No. 15/435,635, filed on Feb. 17, 2017, now Pat. No. 11,367,088.
(Continued)

(51) Int. Cl.
*G06Q 30/02* (2012.01)
*G06N 5/04* (2006.01)
(Continued)

(52) U.S. Cl.
CPC ......... *G06Q 30/0202* (2013.01); *G06F 16/25* (2019.01); *G06F 17/11* (2013.01);
(Continued)

(58) Field of Classification Search
None
See application file for complete search history.

(56) References Cited

U.S. PATENT DOCUMENTS 8,600,858 B1 * 12/2013 Kamruddin ............ G06Q 40/06
705/37
9,165,477 B2 10/2015 Wilson
(Continued)

FOREIGN PATENT DOCUMENTS

WO 2015139119 9/2015
WO WO-2015168727 A1 * 11/2015 ............ G06Q 50/34

OTHER PUBLICATIONS

Stoeckart et al. The implicit power motive predicts action selection. Psychological Research, 81(3), 560-570. Publication Date: Mar. 26, 2016. (Year: 2016).*
(Continued)

*Primary Examiner* — Patricia H Munson
*Assistant Examiner* — Nancy N Prasad
(74) *Attorney, Agent, or Firm* — Greenblum & Bernstein, P.L.C.

(57) ABSTRACT

The invention relates to a computer-implemented system and method for providing data science as a service (DSaaS) using a real time data prediction contest. Participants in the real time data prediction contest are permitted to execute and submit algorithms, utilize third party data sources, and utilize sub-contests to generate data predictions for the data prediction contest. The participants in the data prediction contest may be humans or software robots. A category of sponsor confidential information related to the data prediction is defined and maintained as confidential by the sponsor, while various methods are implemented to obtain relevant algorithms and data for the data prediction. The sponsor receives data predictions from the participants on a real time or near real time basis, calculates a score for the data predictions, and compensates participants according to their score.

18 Claims, 17 Drawing Sheets

Related U.S. Application Data

(60) Provisional application No. 62/432,932, filed on Dec. 12, 2016, provisional application No. 62/420,861, filed on Nov. 11, 2016.

(51) Int. Cl.
  *G06F 17/11* (2006.01)
  *G06F 16/25* (2019.01)
  *H04L 65/403* (2022.01)
  *H04L 65/70* (2022.01)

(52) U.S. Cl.
  CPC .............. *G06N 5/04* (2013.01); *H04L 65/403* (2013.01); *H04L 65/70* (2022.05)

(56) References Cited

U.S. PATENT DOCUMENTS

| | | | |
|---|---|---|---|
| 9,710,767 B1* | 7/2017 | Dietrich | G06Q 10/063 |
| 2010/0106674 A1 | 4/2010 | McLean et al. | |
| 2011/0066544 A1 | 3/2011 | Hughes et al. | |
| 2016/0071017 A1* | 3/2016 | Adjaoute | G06Q 20/4016 706/52 |
| 2016/0232160 A1* | 8/2016 | Buhrmann | G06Q 10/1053 |
| 2017/0315791 A1 | 11/2017 | Mascaro et al. | |
| 2018/0137525 A1 | 5/2018 | Cotton | |

OTHER PUBLICATIONS

Athanasopoulos, G. et al., The value of feedback in forecasting competitions, International Journal of Forecasting, 27(3):845-849 (2011).
Bennett, J. et al., The Netflix Prize, KDD Cup and Workshop, pp. 3-6 (2007).
Bentzien, J. et al., Crowd computing: Using competitive dynamics to develop and refine highly predictive models, (2013).
Bergstra, J. et al., Making a Science of Model Search: Hyperparameter Optimization in Hundreds of Dimensions tor Vision Architectures, ICML, pp. 115-123 (2013).
Buckheit, J. et al., WaveLab and Reproducible Research, Wavelets and Statistics 103:55-81 (1995).
Carter, Virgil et al., Optimal Strategies on Fourth Down, Management Science 24(16):1758-1762 (1978).
Corchón, Luis C., The Theory of Contents: A Survey, Universidad Carlos III De Madrid, Economic Series 26 (Apr. 2007).
Dechenaux, E. et al., A survey of experimental research on contests, all-pay auctions and tournaments, Experimental Economics, 18(4):609-669 (2014).
Dietl, H.M. et al., Overinvestment in team sports leagues: A contest theory model, Scottish Journal of Political Economy 55(3):353-368 (2008).
Donoho, David. 50 Years of Data Science, R Software, p. 41 (2015).
Garrigues, P. et al., An homotopy algorithm for the Lasso with online observations, Advances in neural . . . , (1):1-8 (2008).
Genre, V et al., Combining expert forecasts: Can anything beat the simple average? International Journal of Forecasting, 29(1):108-121 (2013).
Glauner, Patrick Oliver. Comparison of Training Methods for Deep Neural Networks, In arXiv preprint, pp. 1-56 (Apr. 2015).
Goodfellow, Ian et al., Generative Adversarial Nets, arXiv preprint arXiv: . . . , pp. 1-9 (2014).
Guyon, Isabelle et al., A brief Review of the ChaLearn AutoML Challenge: Any-time Any-dataset Learning without Human Intervention, JMLR: Workshop and Conference Proceedings 64:21-30 (2016).
He, K. et al., Deep Residual Learning for Image Recognition, Arxiv.Org., 7(3):171-180 (2015).
Kaggle, Web Page <http://www.kaggle.com/>, 2 pages, Dec. 30, 2014, retrieved from the Internet Archive WayBack Machine <http://web.archive.org/web/20141230051023/http://www.kaggle.com/> on Jun. 6, 2018.
Kaufman et al., Leakage in data mining: Formulation, detection, and avoidance, KDD '11 Proceedings of the 17th ACM SIGKDD International Conference on Knowledge Discovery and Data Mining, pp. 556-563 (2012).
Khaleghi et al., Multisensor data fusion: A review of the state-of-the-art, Information Fusion (2012).
Kim, J., AutoML Challenge: AutoML Framework Using Random Space Partitioning Optimizer, ICML, AutoML Workshop, pp. 1-4 (2016).
Carpenter, J., May the Best Analyst Win, Science 331, pp. 698-699 (Jun. 2011).
Krawczyk et al., Ensemble learning for data stream analysis: A survey. Information Fusion, 37:132-156 (2017).
Kuhn, Max, Caret Package. Journal of Statistical Software 28(5):1-26 (2008).
Lambert et al., Self-Financed Wagering Mechanisms for Forecasting. Group pp. 170-179 (2008).
Lange et al., A Parimutuel Market Microstructure for Contingent Claims. European Financial Management 11:25-49 (2005).
Li et al. The internet of things: a survey. Information Systems Frontiers 17(2):243-259 (2015).
Machete, Reason, Contrasting Probabilistic Scoring Rules. Journal of Statistical Planning and Inference 143(10):1781-1790 (2013).
Mansournia et al., Inverse Probability Weighting, BMJ 352:189 (2016).
McKinsey & Company, Big Data:The next frontier for innovation, competition, and productivity. McKinsey Global Institute (Jun. 2011).
Lauter et al., Can homomorphic encryption be practical? Proceedings of the 3rd ACM workshop on Cloud computing security workshop—CCSW '11, pp. 113-124 (2011).
Osborne et al., On the LASSO and its Dual. Journal of Computational and Graphical Statistics 9(2):319-337 (2000).
Pedregosa, F. et al., Scikit-learn: Machine Learning in Python. Journal of Machine Learning Research 12:2825-2830 (2011).
Polikar, Robi, Ensemble Learning 1:1-34 (2012).
Schmidt, M. et al., Symbolic regression of implicit equations. Genetic Programming Theory and Practice 7:73-85 (2009).
Sheremeta, R., Contest design: An experimental investigation. Economic Inquiry 49(2):573-590 (2011).
Stolfo, S.J., Abstract: KDD Cup 1999 Data, The UCI KDD Archive (1999).
Sutton, R.S. et al., Reinforcement Learning:An Introduction, Learning 3(9):322 (2012).
Tana, M.G. et al., GMAC: A Matlab toolbox for spectral Granger causality analysis of fMRI data, Computers in Biology and Medicine 42:943-956 (2012).
Thakur, Abhishek, Rules for Selecting Neural Network Architectures for AutoML-GPU Challenge, JMLR: Workshop and Conference Proceedings 1:1-4 (2016).
Thornton, C. et al., Auto-WEKA: Combined Selection and Hyperparameter Optimization of Classification Algorithms, Proceedings of the 19th ACM SIGKDD international conference on Knowledge discovery and data mining—KDD (9 pages) (2013).
Tibshirani, R. et al., Strong rules for discarding predictors in lasso-type problems. Journal of the Royal Statistical Society Series B: Statistical Methodology 74(2):245-266 (2012).
Tziralis, G. et al., Prediction Markets: an Extended Literature Review. The Journal of Prediction Markets 1(1):75-91 (2007).
Wang, M. et al., City Data Fusion: Sensor Data Fusion in the Internet of Things. International Journal of Distributed Systems and Technologies (IJDST) (2015).
Welling, M., Herding Dynamic Weights to Learn, Proceedings of the 26th Annual International Conference on Machine Learning—ICML, pp. 1-8 (2009).
Welling, M., Herding Dynamic Weights for Partially Observed Random Field Models. UAI, pp. 599-606 (2009).
Witten, D.M. et al., New Insights and Faster Computations for the Graphical Lasso. Journal of Computational and Graphical Statistics 20(4):892-900 (2011).
Yang, H. et al., Online learning for group lasso. In Proceedings of the 27th International Conference on Machine Learning, pp. 1191-1198 (2010).

(56) References Cited

OTHER PUBLICATIONS

Numerai Master Plan, https://medium.com/numerai/numerais-master-plan-1a00f133dba9 (Oct. 13, 2017).
International Search Report and Written Opinion issued in corresponding International Application No. PCT/US2017/061020, dated Jan. 19, 2018 (9 pages).
International Search Report and Written Opinion issued in corresponding International Application No. PCT/US2019/057870, dated Jan. 16, 2020 (10 pages).
International Preliminary Report on Patentability (IPER) issued in corresponding International Application No. PCT/US2019/057870, dated May 6, 2021 (10 pages).

* cited by examiner

URL ⊙ http://citibike.mobi/                                      — 510

| Attribute △ | Example ⇕ | Type | Index? | Predict? | Attribute |
|---|---|---|---|---|---|
| stationName | Franklin St & W Broadway | 01/01/72 | ☑ | ☑ | ☐ |
| availableDocks | 5 | Int | ☐ | ☑ | ☐ |
| totalDocks | 25 | Int | ☐ | ☐ | ☐ |
| latitude | 0.71117416 | | ☐ | ▯ | ☑ |
| longitude | −73.97032517 | | ☐ | ☑ | ☑ |
| availableBikes | 20 | 06/25/83 | | | |

How far ahead you would like predictions?                        — 518

1 minute   5 minutes   15 minutes   1 hr   4 hrs   1 day   1 week   1 month   1 year How often would you like predictions?

| Page update | Every 5 minutes | Every 15 minutes | Every 1 hr | More options |   — 520

Daily spend?

10¢   $1   $5   $20   $100   $200   $500   $1,000   $2,000   $10,000   $20,000

Submit ▸   — 516

Progress
— 522      — 512

Figure 5

JP-Volume current leaderboard

| Name △ | Reputation ⇕ | Score ⇕ | Uptime ⇕ | Share ⇕ | Host ⇕ | Buy Now | Exclude? |
|---|---|---|---|---|---|---|---|
| Neural42 | 9 | 0.13 | 99.5 | 23.4 | Domino | No | ☐ |
| Alexsa Black | 7 | 0.14 | 100 | 10.5 | JP Data Platform | $10000 | ☐ |
| Tim Degner | 0 | 0.15 | 89.2 | 8.5 | AWS | No | ☑ |
| Forest master | 5 | 0.15 | 100 | 6.6 | JP Data Platform | $500 | ☐ |
| Support Vector 6 | 7 | 0.16 | 80 | 4.4 | JP Data Platform | $500 | ☐ |
| Tim Boelaars | 7 | 0.172 | 100 | 4.4 | JP Data Platform | $2000 | ☐ |
| Tarry | 7 | 0.172 | 100 | 1.0 | AWS | Yes | ☐ |
| Mr Brown | 6 | 0.174 | 100 | 1.0 | Self | No | ☐ |
| Predictero | 10 | 0.176 | 100 | 1.0 | Self | No | ☐ |
| Minorll | 10 | 0.177 | 99 | 1.0 | Domino | No | ☐ |
| Excelsior | 8 | 0.177 | 99.4 | 1.0 | Sciops | No | ☐ |
| BlackTw | 8 | 0.172 | 98.6 | 1.0 | Sciops | No | ☐ |
| Forward | 6 | 0.172 | 99.4 | 1.0 | JP Data Platform | Free | ☐ |
| Benchmark 1 | 5 | 0.18 | 99.4 | | | | |

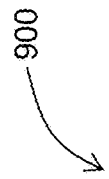
900

Figure 9

Algorithm 2 An algorithm for aggregating probabilistic options and compensating participants base on accuracy.

1:   procedure PARI(I,J)       ▷ $I$ racegoers, $J$ horses
2:      $P \leftarrow I$ by $J$ probabilities such that $\sum_j P_{ij} = 1 \ \forall \ i$
3:      $w \leftarrow \left(\frac{1}{I}, \ldots, \frac{1}{I}\right)$       ▷ Equal initial wealth
4:      $q \leftarrow w^T P$       ▷ Initial market price vector
5:      while True do
6:        $Q \leftarrow [q, \ldots, q]$       ▷ Replicate across columns
7:        $R \leftarrow \frac{P}{Q}$       ▷ Subjective returns (pointwise)
8:        $\pi \leftarrow (0, \ldots, 1, \ldots, 0)$       ▷ Race is run
9:        $w \leftarrow w \circ R_\pi$       ▷ Winners share the pool
10:       $q \leftarrow w^T P$       ▷ Updated market prices
11:       $P \leftarrow next\ P$       ▷ Next race
12:      end while
13:      return $q$       ▷ Consensus reported
14:   end procedure

Figure 11

| Concern | Example | Techniques |
|---|---|---|
| Intent | Sensitive targets | Factor markets (and many below) |
| Theft | Subscription data | Sub-sampling, contamination, blocking, (and all below) |
| Piracy | Reselling | Steganography, bootstrapping, transformation, know-your-data-scientist, (and all below) |
| Privacy | Proprietary data | Allowed-list, private contests bootstrapping obfuscation (and all below) |
| Secrecy | Classified data | Chumming Multi-party computation Structure preserving encryption Boosting Learning algorithms |

Figure 12

|   | Name | Values | Meaning |
|---|---|---|---|
| I | Identifier | Many | Bond identifier |
| T | Horizon | 5, 10, 30 | Number of business days forward we wish to predict trading volume for. |
| S | Side | B, S | B means "bought from contra party" |
| R | Reporting | D, T | D means broker dealer reported the trade. T means an alternative trading venue (ATS) reported |
| C | Contra-party | D, C, A, T | D means counterparty is a dealer; C means counterparty is a customer (non-FINRA member); A means counterparty is a non-member affiliate; T means counterparty is an alternative trading system |

Figure 15

| Contest | Sensitivity | Techniques and remarks |
|---|---|---|
| Volume | Low | Capped trading volume as per the FINRA TRACE tape is essentially public information. See Figure 17 for detailed question parameters. |
| Size | Low | Average size of trade, using the same parameters and filtering of future trades as in the volume contest. |
| Imbalance | Low | Ratio of customer buying versus selling for a given bond. |
| Volatility | Low | Volatility of an indicative price we supply for each bond. Not a directly traded quantity and not super proprietary |
| Mid | Moderate | Chumming for good inference algorithms using purely synthetic data. White-listing of qualifiers for a second, invitation only even using private data. |
| Cover | High | Chumming, claiming and white-listing. |
| Toxicity | High | Structure preserving modification of the data, with scrubbing. |
| Value | High | Used structure preserving modification of the data, with scrubbing, to crowd-source the "value function" (inventory cost). |
| Advantage | High | The future impact on a value function of a decision. White-listing and gamification were both tried. |

Figure 16

| | | | | | | | | | | |
|---|---|---|---|---|---|---|---|---|---|---|
| 7/11/2017 | 15:44:32 | 7/14/2017 | T | 25000 | 92.688 | 12.451 | M | | - | B | | D | C |
| 7/11/2017 | 15:44:30 | 7/14/2017 | T | 25000 | 92.750 | 12.433 | | Y | - | S | | D | D |
| 7/11/2017 | 15:20:53 | 7/14/2017 | T | 50000 | 92.722 | 12.441 | M | | - | B | | D | D |
| 7/11/2017 | 15:20:53 | 7/14/2017 | T | 50000 | 92.782 | 12.424 | | | - | S | | D | D |
| 7/11/2017 | 15:06:42 | 7/14/2017 | T | 1MM+ | 92.750 | 12.433 | M | | - | B | | D | C |
| 7/11/2017 | 14:59:43 | 7/14/2017 | T | 50000 | 92.749 | 12.434 | M | | - | S | | D | C |
| 7/11/2017 | 14:38:22 | 7/14/2017 | T | 1MM+ | 92.875 | 12.398 | M | | - | S | | D | C |
| 7/11/2017 | 14:15:07 | 7/14/2017 | T | 7000 | 94.860 | 11.849 | | | - | S | | D | D |
| 7/11/2017 | 14:15:07 | 7/14/2017 | T | 7000 | 93.000 | 12.363 | M | | - | S | | D | C |
| 7/11/2017 | 14:01:55 | 7/14/2017 | T | 1MM+ | 92.750 | 12.433 | | | - | B | | D | C |
| 7/11/2017 | 13:49:27 | 7/14/2017 | T | 250000 | 92.875 | 12.398 | | Y | - | S | | D | T |

Issue: FTR4360653   Description: FRONTIER COMMUNICATIONS CORP   Coupon Rate: 10.500   Maturity Date: 09/15/2022

Figure 17

SYSTEM AND METHOD FOR PROVIDING DATA SCIENCE AS A SERVICE

RELATED APPLICATIONS

This application is a continuation-in-part of U.S. application Ser. No. 15/435,635, filed Feb. 17, 2017, entitled "System and Method for Providing Data Science as a Service," which claims priority to U.S. Application No. 62/420,861, filed Nov. 11, 2016, entitled "System and Method for Providing Data Science as a Service," and to U.S. Application No. 62/432,932, filed Dec. 12, 2016, entitled "Real-Time Crowd-Sourced Prediction and Control," each of which are hereby incorporated by reference.

FIELD OF THE INVENTION

The present invention relates generally to data science, and more particularly to a system and method for providing data science as a service (DSaaS) using data prediction contests.

BACKGROUND

There is widespread agreement that forecasting and predictive data analytics are paramount to most businesses' ability to compete in today's economy. Forbes has reported that ninety percent of CEOs believe big data will be as transformative as the internet. Many companies are facing significant challenges in adapting to a new world of lower margins, regulatory burdens, and increased competition from the technology sector. To compete effectively in most industries, companies need access to efficient research and data prediction capabilities.

Known approaches for conducting predictive data analytics suffer from some significant drawbacks. For example, a company having limited internal staff to generate predictive analytics may experience significant delays due to project backlogs, as such projects may run for months before yielding a useful result. There are known platforms, such as Kaggle (www.kaggle.com), that have tapped into external communities of data scientists for assistance. These platforms enable a sponsor to run historical data prediction contests to further statistical research. Using the so-called Common Task Framework, an historical data set is provided to participants and a well-defined scoring mechanism is used to compensate them based on the effectiveness of the predictive models they submit.

Historical data science contests, however, have a number of disadvantages. For example, due to inevitable cheating when historical data is used for competitions, the burden left with the data consumer after the competition has ended (including the need to port code), and the ephemeral relevance of the work, the historical data competition model is often not an effective approach. Historical data competitions also tend to be slow moving and thus they generally do not provide the sponsor of the project with a useful predictive model in an expedited time frame.

These and other drawbacks exist with known systems and processes.

SUMMARY

Exemplary embodiments of the invention provide a new style of prediction contest in which participants build models (e.g., published as web services) that respond in real-time to a sequence of questions of a pre-defined type. Successful ideas in machine learning can motivate design patterns for combinations of these real-time prediction contests, with an objective of furthering forecasting, industrial control and decision making in general.

According to one embodiment, the invention comprises a method of simultaneously crowd-sourcing both model selection and data gathering. The method may comprise: (a) transmitting a live stream of questions in a pre-defined format from a central server on behalf of a contest sponsor seeking real-time answers; (b) receiving real-time responses from a plurality of contributed web services generated by participants; and (c) recording answers in real time for offline or online scoring, aggregation of estimates, and deferred compensation to participants. A preferred embodiment of the invention comprises prediction of future values of a source of updating data.

In various embodiments, the invention relates to a computer-implemented system and method for providing data science as a service (DSaaS) using a real time data prediction contest. The method may be executed on a specially programmed computer system comprising one or more computer processors, electronic storage devices, and networks. The method may comprise the steps of: presenting a consumer interface via a network, wherein the consumer interface allows a data consumer to (a) identify a subject data source having data fields that can be predicted, (b) specify at least one data field to be predicted, and (c) specify timing constraints and cost constraints on the prediction of the data fields; presenting a participant interface via the network, wherein the participant interface (y) allows a participant to select a competition in which to participate and (z) provides a web services interface that enables the participant to provide web services via the web services interface, wherein the web services can be called by the web services interface, the web services provide a prediction of the at least one data field, and the web services are permitted to utilize external information sources in generating the prediction; and transmitting, by the consumer interface, the prediction to the data consumer via the network.

According to another embodiment, the invention relates to a computer-implemented method for providing data science as a service (DSaaS) using a real time data prediction contest. Participants in the real time data prediction contest are permitted to execute and submit algorithms, utilize third party data sources, and utilize sub-contests to generate data predictions for the data prediction contest. The participants in the data prediction contest may be humans or software robots. A category of sponsor confidential information related to the data prediction is defined and maintained as confidential by the sponsor, while various methods are implemented to obtain relevant algorithms and data for the data prediction. The sponsor receives data predictions from the participants on a real time or near real time basis, calculates a score for the data predictions, and compensates participants according to their score.

The invention also relates to computer-implemented system for providing data science as a service, and to a computer readable medium containing program instructions for executing a method for providing data science as a service.

Exemplary embodiments of the invention can provide a number of advantages to a business or organization in need of predictive data analytics. For example, the DSaaS system can provide an inexpensive but accurate way to predict any stream of data points by adopting the prediction protocol as described herein. The DSaaS system can improve quality and reduce costs for the system operator and its data consumers' business processes. The DSaaS system can take advantage of a significant and growing community of data scientists or other analysts or individuals who are willing to compete and build services that benefit the requesting data consumers. The DSaaS system can efficiently identify the most relevant machine learning, statistical algorithms, and relevant data for a given task, avoid time consuming in-house iteration, and reduce time to market.

According to other embodiments, the invention can produce an interwoven mesh of searchable, real-time forecasts that collectively map a wide variety of future events and values. Participants have the ability to add more commercial value as compared with traditional historical data science contests by maintaining live algorithms. By operating in real-time, exemplary embodiments of the invention can present participants with an opportunity to provide relevant data, not just models. And rather than an historical prediction contest site where competitions run for a fixed duration, exemplary embodiments of the invention can be understood to comprise an ultra-lightweight market whose price discovery provides an alternative to in-house, quantitative development.

Other embodiments of the invention can provide a streaming data feed registry, real-time model deployment, and request-response delivery of results for easy integration into applications (e.g., a prediction API), resulting in decreasing marginal costs for prediction. Sub-contests, feature markets and meta-contests facilitate separation of concerns. Embodiments of the invention can provide fast, seamless, self-service contest creation via a web dialog that can convert any updating source of data in to a contest specification. Thus, the network can rapidly grow to be a network for prediction constituting an essential sub-stratum for pricing, inventory management, logistics, recommendation and recognition, for example, across diverse industries. These and other advantages will be described further in the detailed description below.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 5 is an example of a data consumer interface that allows the data consumer to specify timing and cost parameters according to an exemplary embodiment of the invention.

FIG. 9 is an example of a leaderboard that ranks data science contests or participants by certain variables according to an exemplary embodiment of the invention.

FIG. 11 illustrates an algorithm for aggregating probabilistic options and compensating participants based on accuracy, according to an exemplary embodiment of the invention.

FIG. 12 is a table providing examples of methods to defend against misuse of data supplied to participants in a real-time prediction contest according to an exemplary embodiment of the invention.

FIG. 15 is a table illustrating question parameters and interpretation for a bond volume prediction contest according to an exemplary embodiment of the invention.

FIG. 16 is a table that includes a listing of contests, relative commercial sensitivity of the data streams involved, and techniques employed according to an exemplary embodiment of the invention.

FIG. 17 illustrates an example of FINRA TRACE reporting of corporate bond trades according to an exemplary embodiment of the invention.

DETAILED DESCRIPTION

Figure 1:
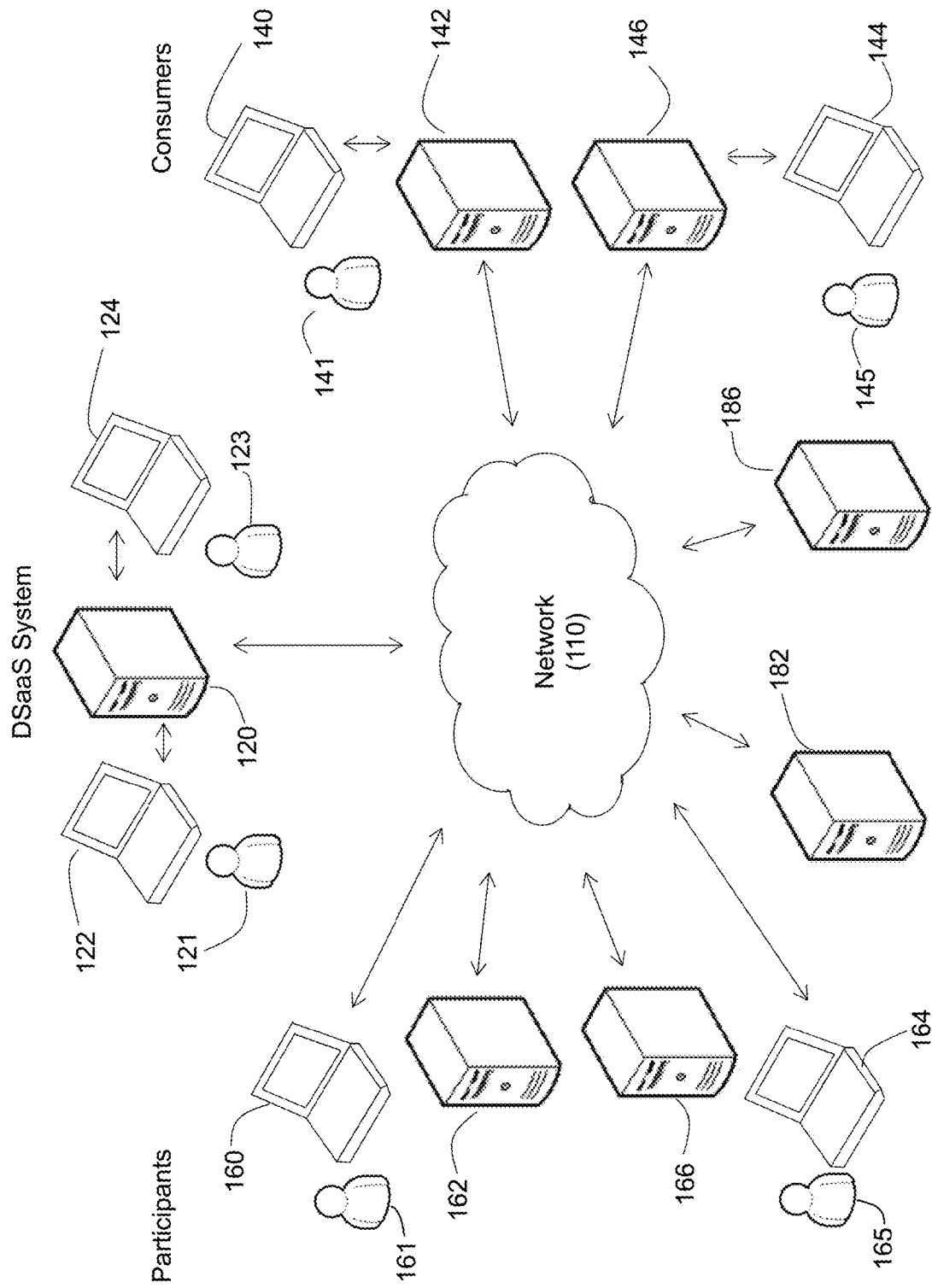
FIG. 1 is a diagram of a system for providing competitive data science as a service (DSaaS) according to an exemplary embodiment of the invention.

Exemplary embodiments of the invention will now be described in order to illustrate various features of the invention. The embodiments described herein are not intended to be limiting as to the scope of the invention, but rather are intended to provide examples of the components, use, and operation of the invention.

Initially, it is helpful to consider some principles of the operation of exemplary embodiments of the invention. One such principle is that data science and predictive data analytics often can be conducted more efficiently by searching for existing external data analytics resources (e.g., computer models) than by building analytics capabilities in-house. According to exemplary embodiments of the invention, data science can be procured efficiently via searching external resources in the space of computer models, meta-parameters, relevant correlated external data sources, data cleaning mechanisms, compute technologies, caching, state management and storage mechanisms, for example. Searching for and obtaining these components of predictive data analytics can provide significantly enhanced efficiencies as compared with developing comparable resources in-house. Forecasting and recommendations can be delivered by a large pool of talent, worldwide, rather than only by an organization's internal data analytics resources.

According to an exemplary embodiment, the invention outsources model searching by providing a data science as a service (DSaaS) system for real-time data science competitions. The DSaaS system can turn a significant liability of known historical data competitions (use of outside data, which permits cheating) into a key asset, by encouraging participants to discover relevant exogenous variables (e.g., external data sources) and use them. In addition, the DSaaS system according to exemplary embodiments of the invention encourages participants to deliver true value to data consumers by launching web services to answer a multitude (e.g., thousands) of questions the DSaaS system relays in real-time, but the DSaaS system provides these participants with a model deployment platform in which this additional step can be accomplished in an expedited time frame, e.g., in minutes.

One embodiment for simultaneously crowd-sourcing both model selection and data gathering comprises a lightweight extension of the programmable web, involving the following components.

1. Relay of a live stream of questions with pre-specified format from a central hub on behalf of a contest sponsor seeking real-time answers. In one embodiment, a real-time contest can be created from any source of updating data. The task before participants is that of predicting the future of this data.

2. A request for a forecast is sent to participants' web services, who reply within a very short period of time, e.g., a few seconds or less.

3. An aggregated answer is relayed to the consumer of the predictions, also in real-time. Answers are recorded in real time for offline or online scoring, aggregation of estimates, and deferred compensation to participants. When the truth regarding the accuracy of predictions is revealed later after the passage of time, participants' scores are updated and this in turn impacts the aggregation. According to an exemplary embodiment of the invention, the primary domain of application for real-time crowd-sourced prediction are those questions where sufficient cross sectional data permits discernment of good from bad models in a short period of time.

The DSaaS system can create a new, efficient workflow that can be exploited by leading companies and organizations and their customers. In the short time frame (e.g., seconds) that may be allotted for a response, participants' bots (e.g., web-based software robots) can scrape company filings, utilize any number of resources on the programmable Web, search for correlated variables in public databases, or even poll for data from their drone. Businesses looking to optimize their operations can have a one stop shop in which forecast models tailored to their specific workflows can be developed in an expedited manner with high reliability and virtually zero or negligible time to market, for example. According to a preferred embodiment, all that is required from the data consumer is a sequence of questions and/or solutions. The DSaaS system can enable computer model search to go the way of internet search, i.e., enabling it to be simple, inexpensive and immediate for the data consumer.

The DSaaS system can provide an inexpensive but accurate way to predict any defined data points by adopting a "prediction protocol." The DSaaS system can improve quality and reduce costs for the system operator and its data consumers' business processes. The DSaaS system can take advantage of a significant and growing community of data scientists or other analysts or individuals who are willing to compete and build services that benefit the requesting data consumers (also sometimes referred to herein as the "sponsors" of the real time data prediction contests). The DSaaS system can efficiently identify the most relevant machine learning, statistical algorithms, and relevant data for a given task, avoid time consuming in-house iteration, and reduce time to market.

According to a preferred embodiment of the invention, the DSaaS system can provide these advantages because, in part, it includes a front end interface making the system accessible and user-friendly to data consumers and participants having little or no computer programming expertise. Working with data science platforms, the DSaaS system makes it easy for data scientists (participants) to launch a REST API service, for example, which receives, manipulates and responds to questions using algorithms they develop themselves. The participant finds a question/answer stream of interest on the system's participant interface and devises an approach. The participant writes a function in a language such as Python, R, Octave or Julia that takes a standardized question and returns an answer. The participant interface allows the participant to easily back-test the function and launch the web services. The DSaaS system pays the participant a stream of income if the participant rises up the leaderboard, thus demonstrating the utility of the offered solution. The DSaaS system can be configured to allow a participant to offer to sell intellectual property rights to his or her algorithms and code to the data consumer (e.g., the sponsor of the contest) or to other participants. This feature allows a participant to monetize his or her cash flows immediately. It may also satisfy certain transparency requirements of sponsoring data consumer institutions and their regulators.

Referring now to the drawings, FIG. 1 is a diagram of a system for providing data science as a service (DSaaS) according to an exemplary embodiment of the invention. As shown in FIG. 1, the system may include one or more networks and one or more computing devices, such as servers and personal computers. The DSaaS system may be operated by a business, a data science company, or other type of organization that seeks to identify requests for data science contests or predictive data analytics from its "data consumers" (e.g., sponsors of the real-time contest), solicit data science solutions (e.g., predictions of certain identified data fields) from a community of "participants" (e.g., data scientists, analysts, or other individuals), and provide some or all of those solutions to its data consumers.

As shown in FIG. 1, the DSaaS system may be embodied primarily in a server 120 owned and/or operated by the company or organization providing the service (the "DSaaS provider"). The server 120 may be operated by a data science contest manager 121 at the DSaaS provider using a personal computing device such as a laptop computer 122. The manager 121 may be responsible for executing a particular data science contest or series of contests. The server 120 may also be accessed by one or more data analysts 123 using their personal computing devices such as laptop computer 124. The data analyst 123 may access the DSaaS system and associated data and results to evaluate the accuracy and utility of various predictive models or results provided by participants in a data science contest, for example.

The DSaaS system 120 communicates with other systems via a network 110 as shown in FIG. 1. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

Also shown in FIG. 1 are servers and personal computing devices of data consumers. The data consumers may be businesses or other organizations that need data predictions and predictive data analytics delivered to them in a cost effective and timely manner, such as business intelligence, financial predictions, scientific predictions, and/or automation. There are many examples of businesses or organizations that are data consumers. One particular example might be a financial institution that needs to predict the trading volume of a security such as a particular bond over a future period of time. Other examples may include an electric utility that needs to predict demand for electricity during various defined future time periods, an online retailer that needs to predict demand for various products and services it offers during defined time periods, a bicycle sharing service such as www.citibikenyc.com that has a need to predict the number of bikes available at various stations, and a business that needs to predict sales conditional on a hypothetical choice of price. In the latter example, an objective of the business would be to capture the price optimization category, such as predicting movie sales according to discounts offered, hotel room bookings according to price, or even the number of candy bars sold by a vending machine conditional on a hypothetical choice of price.

FIG. 1 depicts two such data consumers. A first data consumer such as a retailer may have an analyst 141 who interacts with the DSaaS system 120 via a personal computing device 140 and corporate server 142, for example. A second data consumer such as a bicycle sharing service may have an analyst 145 who interacts with the DSaaS system 120 via a personal computing device 144 and corporate server 146. Many other examples of data consumers and types of predictive data exist for different retailers, service providers, financial institutions, healthcare providers, government agencies, and other organizations and individuals.

FIG. 1 also depicts participants who provide data science solutions, modeling, and/or predictions to the DSaaS system according to exemplary embodiments of the invention. The participants may be data scientists, analysts in a particular industry, or simply individuals who have knowledge or experience in predictive data analytics and who are interested in providing proposed solutions (e.g., predictions of certain data fields) to the DSaaS system in exchange for potential compensation based on the effectiveness of their proposed solution or data prediction. FIG. 1 depicts a first participant 161 who may interact with the DSaaS system via their personal computing device 160 and the network 110, for example. The first participant 161 may also arrange to make his or her predictive analytic solution continuously available by uploading it to a server 162, e.g., a cloud server of a cloud computing service such as Amazon Web Services (AWS). FIG. 1 depicts a second participant 165 who may interact with the DSaaS system via his or her personal computing device 164 and the network 110. The second participant 161 may also arrange to make his or her predictive analytic solution continuously available by uploading it to a server 166.

Also shown in FIG. 1 are two third party servers 182 and 186. The third party servers 182, 186 represent external data sources that participants can draw upon and incorporate as input to their models. For example, the participant 165 may create a web service that predicts the number of bicycles available at a particular bike sharing station. As part of his or her solution, the participant may create a REST API that automatically queries weather station data maintained by a third party server 182 (because the weather may influence the likelihood that people will rent bikes). The participant may also create a REST API that automatically queries traffic data maintained on another third party server 186 (because heavy traffic may influence the likelihood that people will rent bikes). The participant can therefore improve his or her predictive capability by drawing upon third party data using an appropriate interface and query.

Those skilled in the art will appreciate that exemplary embodiments of the invention can be utilized to provide data science as a service to a wide variety of data consumers starting with a large community of participants and is not limited to the examples set forth herein. In addition, the diagram shown in FIG. 1 is merely one example of a DSaaS system configuration and its interfaces with other systems and is not intended to be limiting. Those skilled in the art will appreciate that other types and configurations of networks, servers, databases and personal computing devices (e.g., desktop computers, tablet computers, mobile computing devices, smart phones, etc.) may be used with exemplary embodiments of the invention.

Figure 2:
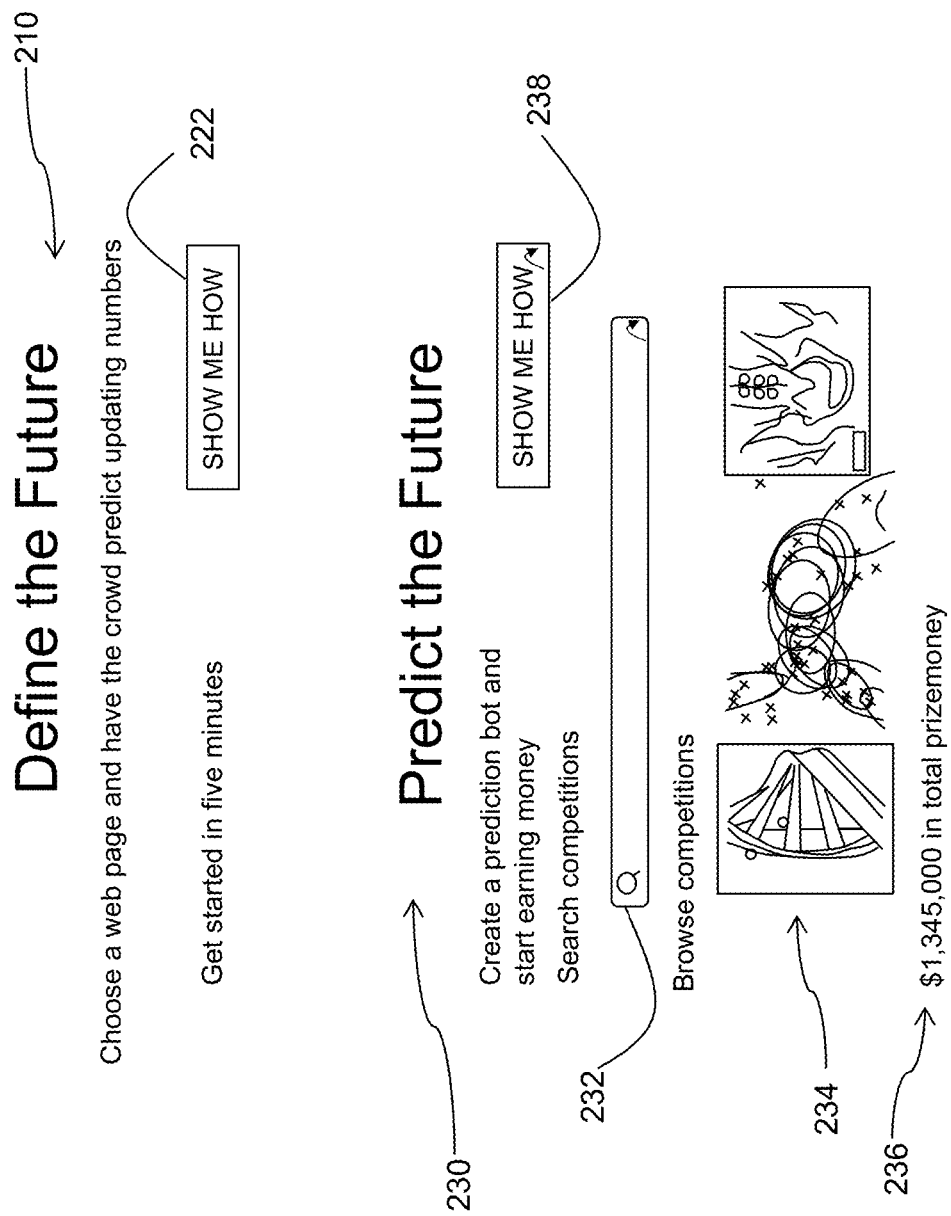
FIG. 2 illustrates an example of landing web page for the DSaaS system according to an exemplary embodiment of the invention.

FIG. 2 illustrates an example of a landing web page of the DSaaS system providing an interface between the DSaaS system, the data consumers and the participants. As shown in FIG. 2, a data consumer may begin under the header entitled "Define the Future" where the web page or software application ("app") indicates that the consumer can choose a web page or other subject data source that updates and have the crowd (participants) predict updating numbers. The data consumer can click on the button 222 entitled "SHOW ME HOW" to get started.

The participant, such as a data scientist, analyst, or individual, can get started under the heading entitled "Predict the future" 230. The web page or app indicates that the participant can create a prediction bot and start earning money. It also includes a search bar 232 to search available data competitions, a number of icons 234 that the participant can click on to browse various available data competitions, and an indication 236 of the total amount of prize money available. The web page also includes a button 238 entitled "SHOW ME HOW" to enable the participant to obtain detailed information on the rules and resources available for participating in a data science competition.

Figure 3:
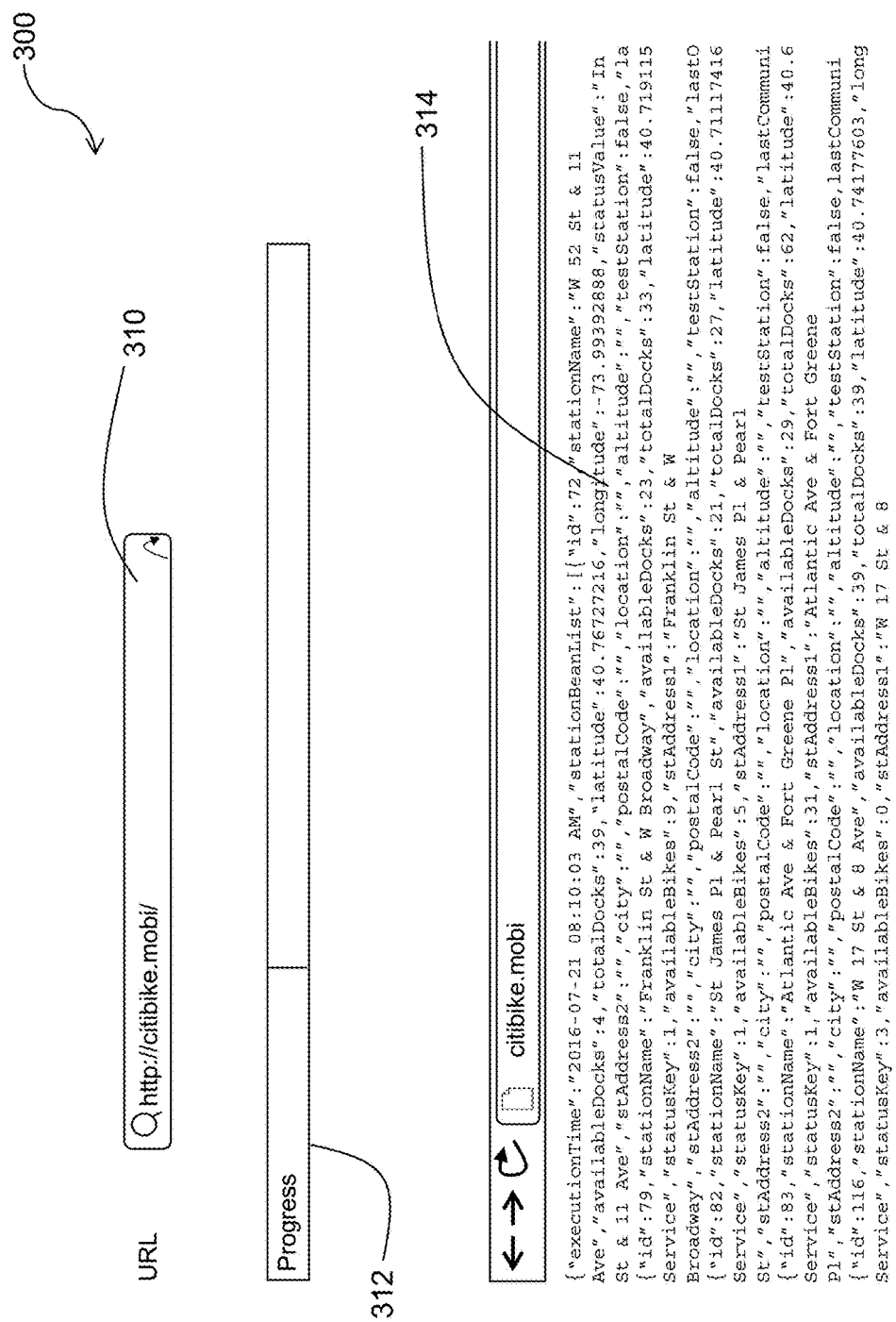
FIG. 3 shows an example of a data consumer interface of the DSaaS system according to an exemplary embodiment of the invention.

If the data consumer chooses to proceed with defining the data it would like to have predicted by various participants, the data consumer can begin, for example, by identifying a subject data source containing the one or more data fields to be predicted. The subject data source may comprise any identifiable data source such as a website or a table in a database, for example. The subject data source may include data fields that are updated periodically, according to a preferred embodiment of the invention. The data consumer may identify the subject data source with an address, e.g., by inputting a uniform resource locator (URL) for a website that includes the data fields to be predicted. FIG. 3 illustrates an example of a consumer interface 300 provided by the DSaaS system as a web page or app in which the consumer has identified http://citibike.mobi/ in the address bar 310 for the URL. The consumer interface 300 also includes a progress bar 312 that illustrates for the data consumer how far along he or she is in the process of defining the data fields to be predicted. One of the advantages that various embodiments of the invention can provide is a process that is simple and expedient for both the data consumer and the participant, thus enhancing the likelihood that data consumers and participants will use and rely on the DSaaS system.

FIG. 3 illustrates an example of the structured data 314 (JSON in this example) that is provided by the subject data source. In this example, the Citibike web site broadcasts the number of available bikes and free bike docks at New York City bike stations, together with static attribute data such as the name, latitude and longitude of the bike station. This web page is public and maintained by the bike sharing program in order that developers can access the data in a convenient programmatic manner. The page updates at regular intervals, approximately every minute, and thus provides real-time time series data of interest to a large number of interested parties. Typically, the current value of this data would be consumed by application developers, but according to exemplary embodiments of the present invention, a substantially identical page is maintained by the DSaaS system comprising future estimates of these quantities, e.g., 15, 30, 60, and/or 90 minutes in the future. The predicted data is made available to the data consumer that requested it, according to the format, content, interface, and timing requirements specified by the data consumer according to one embodiment of the invention. The data consumer pays compensation to the DSaaS system that it agreed to pay when requesting the predicted data. The DSaaS system compensates the participants based on the quality score of their predictions, as will be discussed further below.

Figure 4:
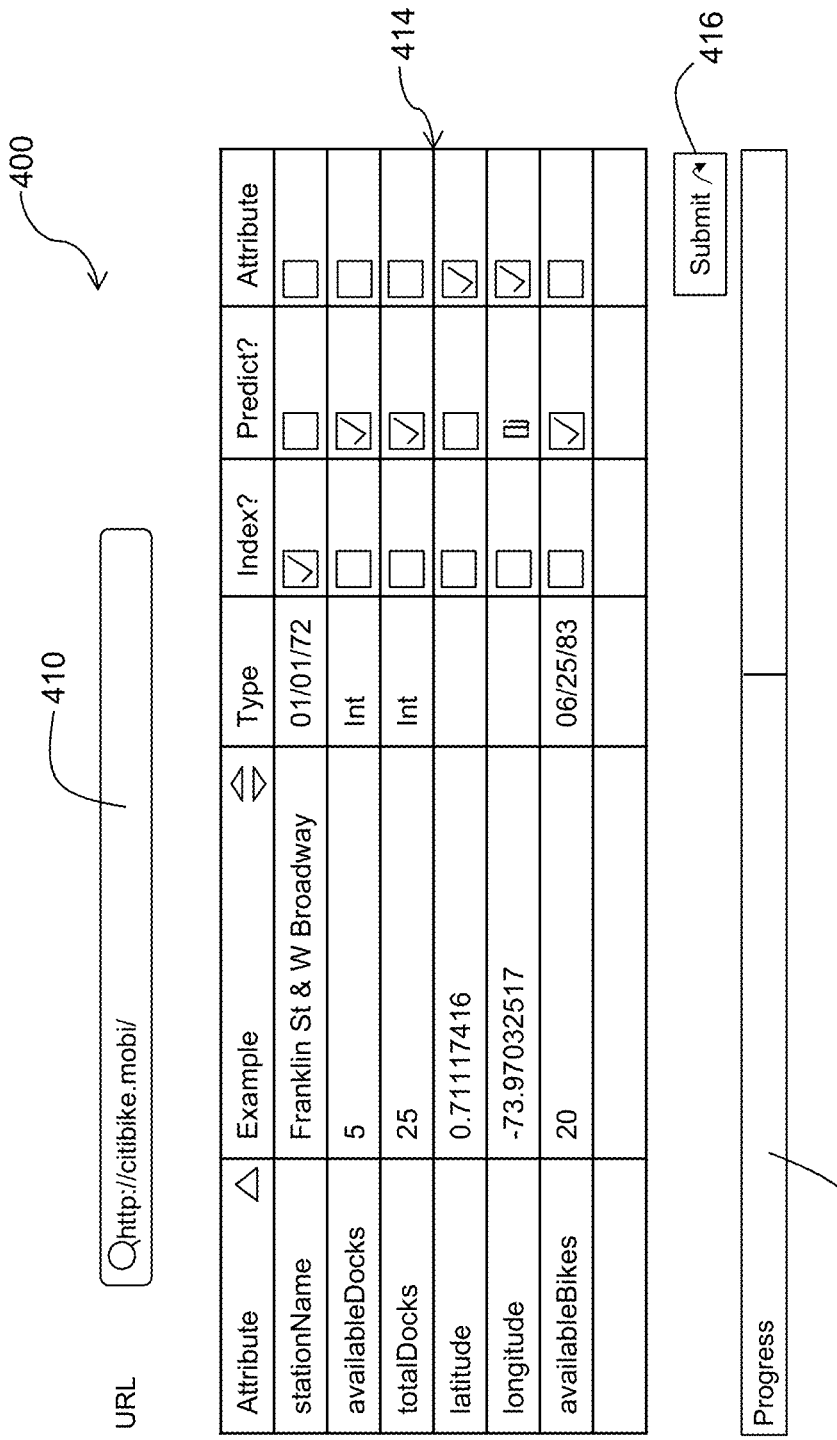
FIG. 4 depicts an example of a data consumer interface that allows a data consumer to specify the data fields to be predicted according to an exemplary embodiment of the invention.

FIG. 4 depicts an embodiment of a consumer interface 400 provided by the DSaaS system according to an exemplary embodiment of the invention. As shown in FIG. 4, the website containing data fields to be predicted is the Citibike website that is used to manage the bike share program in New York. The consumer interface 400 includes an address bar 410 in which a consumer can specify an address such as a URL or other identifier of the data source containing the one or more data fields to be predicted. The consumer interface 400 includes a progress bar 412 showing the relative progress of the consumer in defining the data fields to be predicted.

The consumer interface 400 also includes a table 414 that lists one or more attributes, examples of the attributes, data types for each attribute, and check boxes to allow a consumer to indicate whether the attribute is an index value, a value to be predicted, or an attribute that is fixed. In this example, the table 414 provides the attributes, including station name, number of available docks, total number of docks, latitude and longitude of the station, and the number of available bikes. The website allows the data consumer to specify with check boxes which data fields are to be predicted, which data fields are attributes, and which data fields constitute an index. In the example shown in FIG. 4, the data consumer has used the check boxes to specify that the station name (Franklin St & W Broadway) is to be used as the index, the latitude and longitude are to be treated as attributes, and the available docks, total docks, and available bikes are the data fields to be predicted. Once the data consumer has assigned these designations, he or she can click the submit button 416 to submit the designations to the DSaaS system. As can be observed from FIG. 4, the process that a data consumer undertakes to choose a subject data source of interest and to define the data fields to be predicted in that subject data source can be completed in a short time frame and is easy to understand. This enhances the likelihood of use of the DSaaS system by potential data consumers who are not necessarily tech savvy or well versed in computer languages.

Referring to FIG. 5, in addition to the address bar 510, the progress bar 512, and the table 514, the DSaaS system allows the data consumer to define the desired data predictions with additional parameters and constraints. For example, the consumer interface 500 includes a sliding button 518 that allows the data consumer to specify how far into the future the data consumer would like the data predictions. Multiple buttons 518 can be included to request predictions at multiple points in the future. The interface 500 includes a button bar 520 that allows the data consumer to specify how often the page should be updated. The consumer interface 500 also allows the consumer to indicate with a sliding button 522 the amount of money it is willing to pay per day for access to the data predictions it has requested. Once the data consumer is happy with the selections, he or she can click on the submit button 516.

Figure 6:
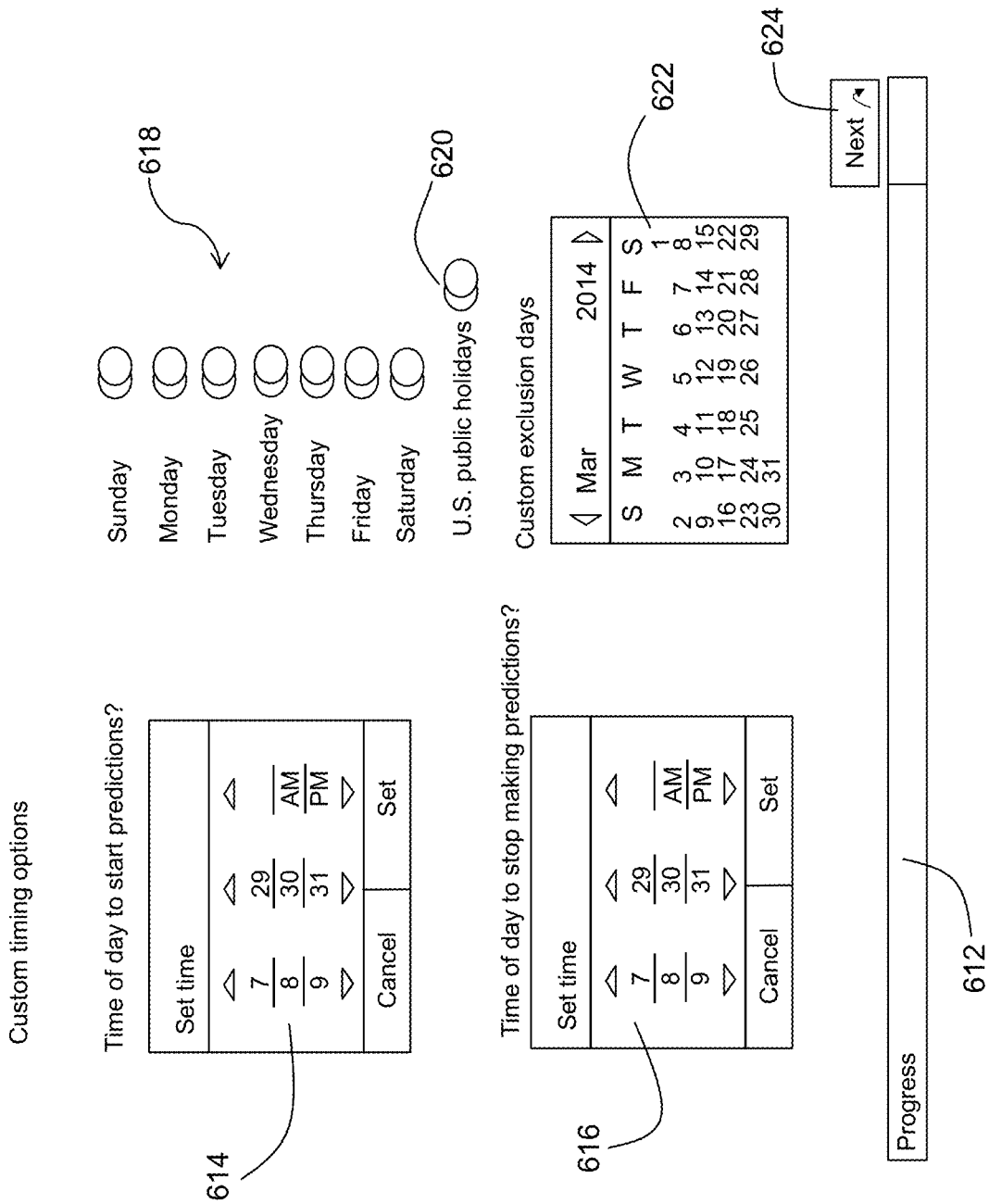
FIG. 6 depicts an example of a data consumer interface of the DSaaS system that allows the data consumer to specify additional timing parameters according to an exemplary embodiment of the invention.

FIG. 6 is an illustration of a consumer interface providing additional functionality to further define the predictions that are desired. As shown in FIG. 6, the consumer interface provided by the DSaaS system allows the consumer to specify custom timing options, such as the time of day to start predictions 614, the time of day to stop making predictions 616, the days of the week to make predictions 618, whether to make data predictions on US public holidays 620, and custom exclusion days 622. The data consumer can click the "Next" button 624 after making his or her selections. The data prediction needs defined by the data consumer using the consumer interface may be used by the DSaaS provider to create a data science contest. Using the functionality shown in FIGS. 3-6, the data consumer is able to quickly and easily indicate in detail the data fields it would like to see predicted, the exact times during which predictions are desired, and the amount of expenses it is willing to pay per day.

As explained above, in an exemplary embodiment of the present invention, a non-programmer can specify quantities to be predicted by the crowd (participants) in a manner that does not require programming. This is because web pages or other sources of updating data (often but not always in tabular format) are implicitly time series. However, not all of the numbers, strings, categorical or other data reported on said sources of data need be the target for prediction. Some data, as with the name of a Citibike location, is a static attribute and can be considered a way of indexing (parametrizing) the precise question to be asked. Other data, such as the latitude, is considered ancillary information—possibly of interest or use to forecasting but not essential to the definition of the task for the crowd. In an exemplary embodiment a non-technical user can be guided through a dialog, as indicated in 414, in order to instruct the system which quantities are to be predicted, which are to be used to index distinct predictions, and which are merely ancillary attributes. Furthermore in 518 and 520 a means of interrogating the user for forecast horizon and times at which predictions should occur is shown and in this example the data consumer is instructing the DSaaS system that they wish to trigger predictions every time the page updates and that contestants (participants) should be judged based on the values shown in the page fifteen minutes henceforth from those trigger times. It will be apparent to one skilled in the art that other means of soliciting these preferences are possible. Furthermore, in FIG. 5, element 522, an embodiment of a slider is illustrated by which the data consumer determines how much money to spend on a per diem basis. Furthermore, in FIG. 6, examples of additional customizations a data consumer might achieve are provided, again without programming. For instance, with 614 and 616 used in conjunction, the data consumer user is able to instruct the system that they are only interested in predictions between a supplied start time and end time of day. Furthermore, in 618, 620 and 622 the data consumer is able to instruct the system of weekday, holiday and day of month preferences, thus allowing them to run the contest on only Sundays, for example. It will be apparent to one skilled in the art that other ways of providing scheduling information are possible, including the provision of a dialog box permitting the user to enter terse but more powerful scheduling syntax such as the CRON format.

Figure 7:
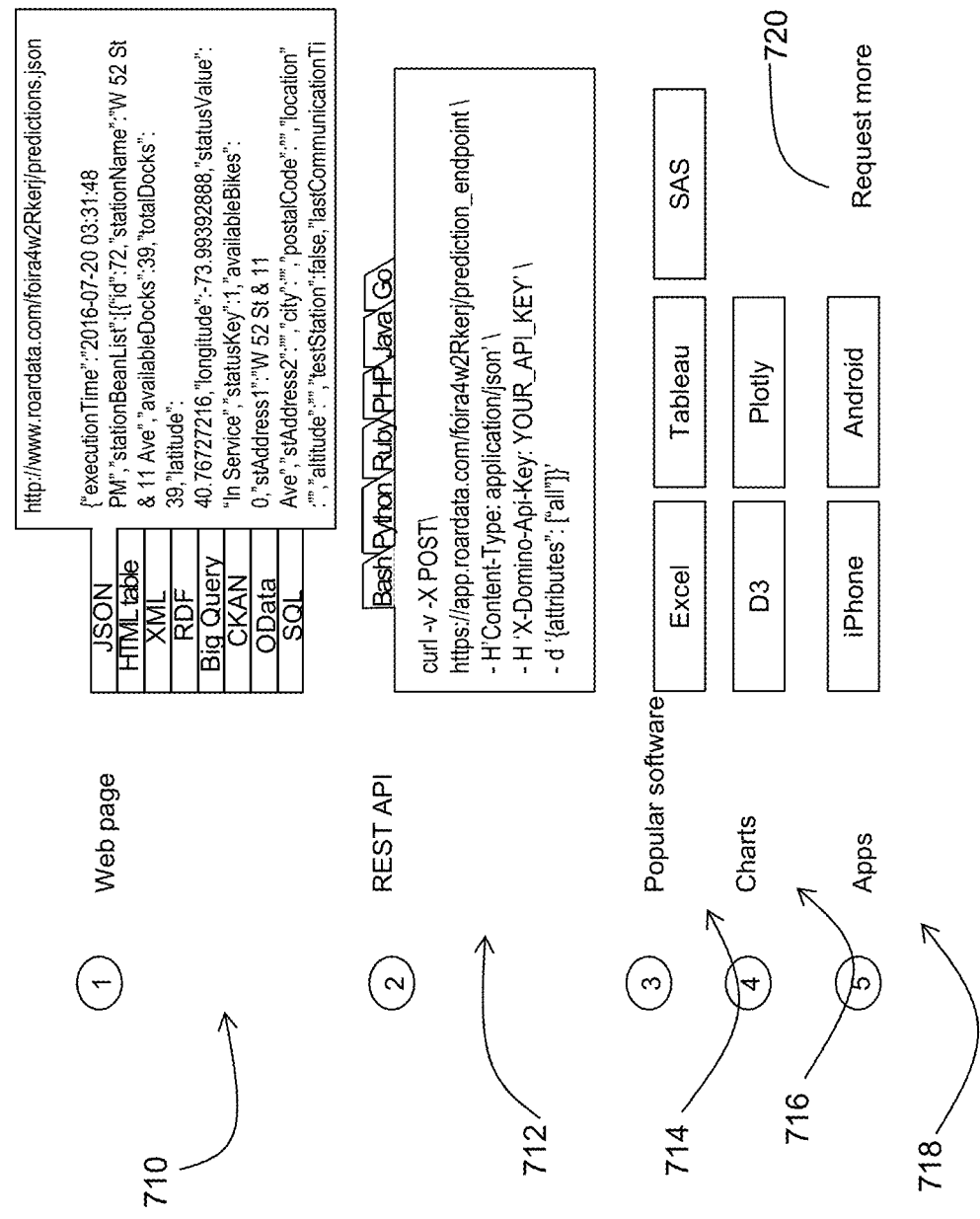
FIG. 7 is an example of a data consumer interface that provides a number of interface options for web services provided by participants according to an exemplary embodiment of the invention.

After the data consumer has defined a data science contest, the DSaaS system can provide the data consumer with information that assists him or her with obtaining and using the results of the data science contest when they begin to be available. FIG. 7 shows one example of the type of information that the DSaaS system can provide to the data consumer. As shown in FIG. 7, the DSaaS system includes a consumer interface that has a number of different methods/interfaces for accessing the results of the data science contest. For example, the data consumer may access the results via web page 710, REST API 712, commercially available software 714, charts 716, and apps 718. Web page access may be provided using languages such as JSON, HTML table, XML, RDF, BigQuery, CKAN, OData and SQL, as shown in FIG. 7. REST API access may be provided using languages such as Bash, Python, Ruby, PHP, Java and Go. Popular software may include Excel, Tableau, and SAS. Available charts may include D3 and Plotly. iPhone and Android apps may also be provided. The consumer interface may also include a button 720 allowing the data consumer to submit a request to the DSaaS system for additional interfaces. By providing a wide selection of interfacing technologies, the DSaaS system provides many options to a data consumer for automatically interfacing to solutions provided by the DSaaS system. The data consumer can program its own systems (e.g., 142, 146 in FIG. 1) to call or query the DSaaS system 120 at predetermined times using such interfaces.

It will be apparent to those skilled in the art that standard examples of accessing web based data in different programming languages can be automatically generated and further customized for convenience of use. It should be furthermore apparent to one skilled in the art that a software application on a phone, tablet or personal computer can use the interfaces exposed in 710 or 712 and thereby allow a user to ask a question and receive an answer. For example an app on a mobile phone might ask a user to select a bike station, or suggest a bike station based on location, and report forecast results arrived at according to exemplary embodiments of the invention. Thus, one advantage that can be provided by exemplary embodiments of the invention is that the data consumer can easily specify the content, format, interface, and/or specific timing requirements of the data predictions that it is requesting. This ability to specify in detail the requested data reduces the data consumer's workload in using such data or incorporating such data into its business operations.

Figure 8:
FIG. 8 illustrates an example of a competition browser for a participant interface according to an exemplary embodiment of the invention.

Turning now to the perspective of the participant (e.g., data scientist, analyst, or individual), the DSaaS system may publicize the data science contest on a participant interface so that the community of participants has the ability to begin devising models and producing web services that are responsive to the data science contest. FIG. 8 illustrates an example of a competition browser that is part of the participant interface. The competition browser lists data competitions that are available to participants wishing to submit proposed solutions (e.g., predicted data derived from software models). The competition browser 800 may be configured to provide a list of categories and subcategories of data competitions. For example, as shown in FIG. 8, the categories may include Finance, Medicine and Real Estate. Under each category may be listed at least one level of subcategories. For example, under the Finance category is listed Volume prediction, Earnings announcements and Entitlements prediction. Similar subcategorization is shown in FIG. 8 for the Real estate category. Additional levels of subcategorization may also be implemented. The competition browser 800 may also show the amount of prize money available for each category and subcategory. This configuration allows potential participants to easily identify competitions in which they may be interested in submitting a response based on subject matter and potential income.

Once a participant selects a data science competition in which to participate, he or she can then begin to create a web service that automatically interfaces to the DSaaS system to provide predictions at predetermined times and/or in response to queries from the DSaaS system. The DSaaS system preferably includes a web services interface that is a component of the participant interface and that makes the DSaaS system accessible and user-friendly to participants. Participants can launch web services and begin generating real-time responses using data science platforms, technologies, and standard model deployment tools such as Domino Data Lab (wwwdominodatalab.com), APISpark (https://restlet.com/products/apispark/), Amazon Web Services (aws.amazon.com), Eve (python-eve.org), Octopus Deploy (https://octopus.com/), Yhat (www.yhat.com), Apiary (https://apiary.io/), Deployd (http://deployd.com/), Azure (azure.microsoft.com), and Google (cloud.google.com), for example.

According to one embodiment, the participant uses RESTful web services to provide his or her predictions of the data field(s) as requested by the data consumer. The web service may comprise a REST API service that receives, manipulates, and responds to queries using a software-based model developed by the participant. The participant finds a question/answer stream of interest on the DSaaS system's participant interface and devises an approach, e.g., builds a software model or function. The participant may write a function or model in Python, R, Octave, Julia, or other programming language, for example, that takes a standardized question and returns an answer.

The RESTful web services may utilize an http protocol, for example. The web services can employ a software-based model and can be hosted by the participant and identified by a uniform resource identifier (URI) or uniform resource locator (URL). The web services can also be programmed to call other web services (e.g., third party data services provided via a third party server) in use of the software-based model. The web services provide the prediction of the at least one data field in real time or near real time to the DSaaS system.

The participant can back-test the function or model underlying the web services with one click according to an exemplary embodiment of the invention. For example, the web services interface that is a component of the participant interface may allow the participant to identify the web services with a URL and to back-test the function on a known data set by pressing a "back-test" button. This functionality allows the participant to more easily evaluate the accuracy of his or her model prior to submission of data predictions to the DSaaS system. The participant can also launch the web service with one click according to an exemplary embodiment of the invention. For example, after the participant is satisfied with the model's performance, he or she can click a "submit" button on the web services interface to allow the web services interface to thereafter call the participant's web services using a predefined protocol. As will be appreciated by those skilled in the art, the foregoing features of the web services interface allow a participant with a basic understanding of computer programming to build, test and submit web services to the web services interface.

According to preferred embodiments of the invention, the participants are permitted to use third party data sources in providing their web services. This feature can provide significant advantages over known historical data science competitions in which the training data and test data are carefully defined and limited. According to exemplary embodiments of the invention, the participant can identify and use external data sources in innovative ways to improve the performance of his or her predictive model. That is, the participant can provide web services that provide predictive data that is generated with both (1) a model or function created by the participant and (2) one or more external data sources identified by the participant that are used as input to the model. Thus, the DSaaS system obtains the benefits of external models created by participants as well as innovate identification and use of external data sources used in the participants' models. The external data sources fed into the model can also provide the benefit of real time information for more accurate predictions.

According to another embodiment of the invention, the participants who provide the web services also manage other aspects of the model and input data. For example, unlike an historical data competition in which the participant simply provides a completed model, according to exemplary embodiments of the invention the participant creates the model, hosts the model, finds and uses external data sources, maintains and improves the model and data sources, manages related aspects of the process such as data storage, and uses the model and data to provide web services that provide predicted data in real time or near real time to the DSaaS system upon request or at predetermined times. The participant, after using and observing the model over time, may modify the model to improve its accuracy, or may change the input data sources. For example, the participant may reevaluate the relevance of the model or components of the model, may change the model computations, or may otherwise maintain the model over time. The participant may also make certain decisions regarding the type and amount of data to store for the model and how and where to store the data, including considerations as to data compression and state management.

The participant also has the ability to combine and reuse models according to exemplary embodiments of the invention. According to one example, the participant may utilize a software model that has been previously used in a data science competition, e.g., an historical data science competition in which only a defined, public data set is permitted to be used and no external information sources are permitted to be used. The participant may also combine different models to improve predictive performance, such as by calling other models with web services, as will be discussed further below. According to other embodiments of the invention, the participant's web services can be designed to automatically search for relevant third party algorithms to be used in providing the data predictions to the DSaaS system.

According to another aspect of the invention, the participants can design the web services so that they provide forecasts for a plurality of contingent scenarios. Real-time competitions can be used to assess action-conditional outcomes. According to this embodiment, the participants predict the results of every action that might be taken, and choose the best action. The result of that action should be quantifiable. One example is baseball pitch selection. Assume it is the bottom of the ninth inning. The away team holds a one run lead, but the home team has a man on second base with one out. The count is full. The last pitch was a successful high fast ball. What pitch should come next? An answer may be supplied by the crowd (i.e., the participants), not the catcher. In an action-conditional competition, the participants submit multiple probability estimates of a game win, one for each possible pitch. The collective forecasts may be aggregated separately for each possible action using aggregation methods described below. The crowd concludes that throwing a curveball will result in the highest probability of winning the game (e.g., multiple participants submit their predictions, and the DSaaS system calculates and aggregated answer). The pitcher takes the advice. The batter strikes out. The process is then repeated for the next pitch, which calls for the next real time question to the web services, and so forth. Accordingly, exemplary embodiments of the invention can be used to make real-time decisions based on forecasts for a plurality of contingent scenarios.

According to another aspect of the invention, the data predictions from a number of participants can be aggregated to provide an improved prediction. In this embodiment, the DSaaS system records all predictions made by all participants and performs both an allocation of points to participants (governing subsequent payments made to them—this is done ex post when the true quantities are revealed by the passage of time) and an aggregation of forecast opinion into a single number or collection of numbers. In an exemplary embodiment, both the scores allocated to participants pertaining to a fixed time interval and the weights used to combine participants' forecasts into a single forecast coincide, and are equal to the inverse of the mean square error of participants' entries. Other aggregation methods can be used to aggregate data provided by multiple participants according to an exemplary embodiment of the invention, as will be discussed further below. In fact, the aggregation method itself can be the subject of a data science competition.

In another embodiment, participants supply probabilities for a finite number of discrete, mutually exclusive and collectively exhaustive outcomes. In this embodiment the weights assigned to participants' forecasts are initially equal, but thereafter are adjusted up or down based on a scoring system modeled after the pari-mutuel system employed at racetracks. In this embodiment it is initially assumed that participants' weights are synonymous with wealth and that they bet a fraction of their wealth equal to their forecast probability on each of the outcomes. Then, the total wealth is reassigned back to participants in proportion to their investment only in the one outcome that was realized. The parimutuel system will be described in further detail below. It will be apparent to one skilled in the art that there are other ways of aggregating forecasts and allocating scores, such as methods in which scoring rules can be designed to solicit probabilistic opinions or point estimates.

FIG. 9 is an example of a leaderboard that can be generated and provided by the DSaaS system as part of the participant interface. The leaderboard 900 lists the names of the leading data science contests in a particular data science competition. The leaderboard 900 also provides related information for each data science contest, such as reputation (a measure of a participant's overall performance in all contests, not just the current contest), score (for the current contest over the current time window—for instance going back one month), uptime (the percentage of questions they have answered during said time), share (of total compensation paid out), host (the location where participant's solution resides), "buy now" (the participant's decision whether to sell its IP rights to its solution), or exclude (a check-box the sponsor of the competition can use to ignore certain participants). The leaderboard can be configured to allow participants to sort the leaderboard by any of the foregoing variables. In the FIG. 9 example, the contests are ranked by share.

The DSaaS system can be configured to automatically make payments to participants, e.g., by direct deposit, PayPal deposit, or other payment process, based on a predefined criteria, such as the participant's score, the total amount of compensation authorized by the requesting data consumer, and the applicable time period. The payment terms, including amount, criteria, and timing for payments, are provided to each participant at the beginning of the data science competition according to a preferred embodiment.

Figure 10:
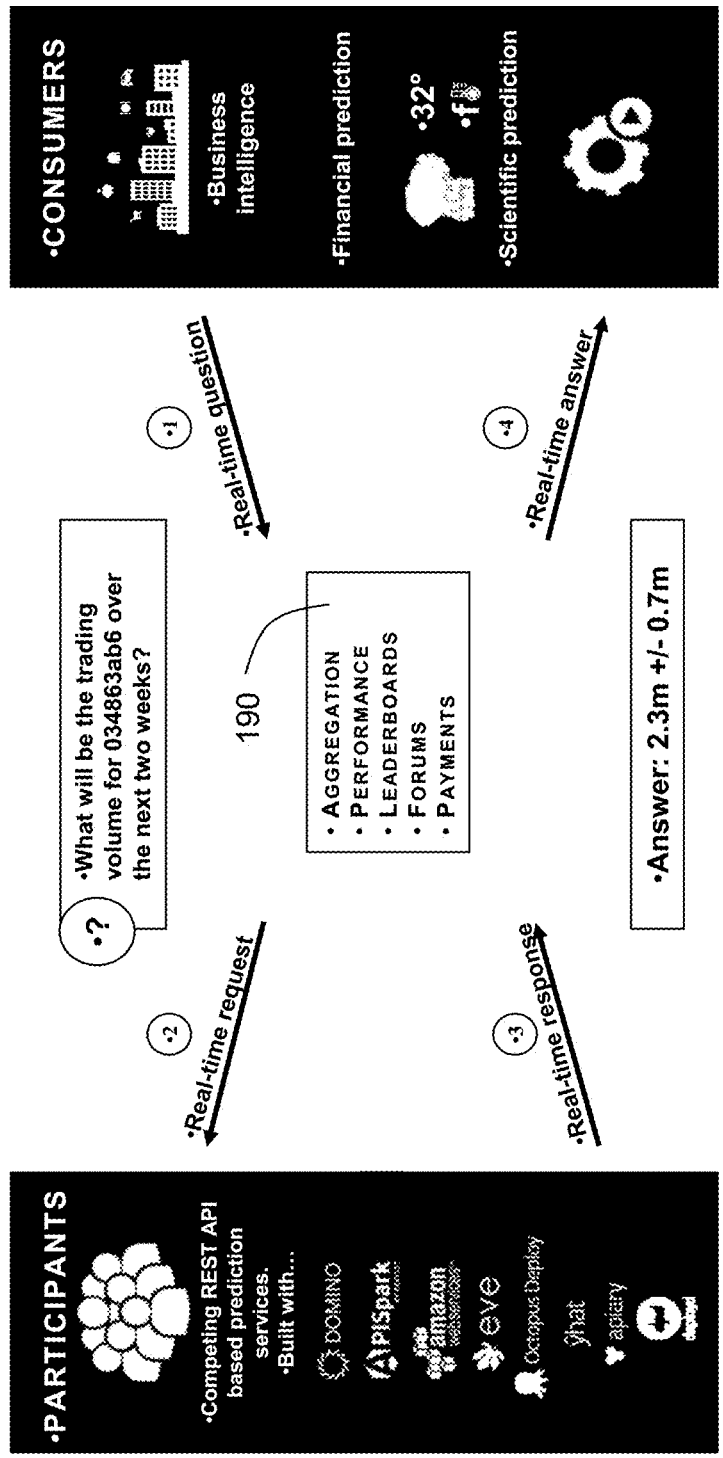
FIG. 10 is a drawing illustrating an example of the real-time provision of data science as a service according to an exemplary embodiment of the invention.

FIG. 10 is a drawing that depicts particular examples of use of the DSaaS system according to exemplary embodiments of the invention. In FIG. 10, the data consumers may include organizations in need of business intelligence, financial predictions, scientific predictions, and/or automation, for example. In this example, the data consumer is interested in obtaining a prediction of the trading volume for a particular bond (e.g., CUSIP 033863ab6) over the next two weeks. In step 1 shown in FIG. 10, the data consumer can submit this real-time question by identifying the website (subject data source) and data field where this data is posted using the consumer interface as described above. In step 2, the DSaaS system 120 makes a real-time request to participants by creating a data science contest and posting it on a competition browser, such as the one shown in FIG. 8. Participants can begin generating real-time responses using data science platforms and technologies such as Domino (www.dominodatalab.com), APISpark (https://restlet.com/products/apispark/), Amazon Web Services (aws.amazon.com), Eve python-eve.org, Octopus Deploy (https://octopus.com/), Yhat (www.yhat.com), Apiary (https://apiary.io/), and Deployd (http.//deployd.com/), for example, as depicted in FIG. 10. Participants submit responses to the DSaaS system in step 3. The DSaaS system evaluates and processes the responses and provides a real-time answer to the data consumer in step 4.

As indicated in FIG. 10, element 190, the DSaaS system can provide other related functionalities, such as aggregation, performance, leaderboards, forums and payments. Aggregation refers to the process of combining participants' forecasts into a single number or other summary information (such as lowest quartile and highest quartile) as will be discussed below. Performance refers to calculation of a performance metric for each proposed solution submitted by a participant according to predetermined, agreed upon criteria. The performance metric may be used in calculating each participant's compensation for a particular data science contest. Some examples of the calculation of the performance metric (score) are discussed above. According to another embodiment of the invention, the method involves assigning a point to any participant finishing in the top decile. It will be apparent to those skilled in the art that other methods are possible and that this decision might be left to the data consumer. Leaderboards, such as the example shown in FIG. 9, provide data on the leading contests and may be ranked by different variables. Forums provide a communication platform whereby participants and data consumers can exchange ideas and data relating to data science competitions. Payments refers to the process executed by the DSaaS system for calculating and paying compensation to each qualifying participant based on the amount authorized by the requesting data consumer and the participant's performance metric described above.

Advantages of Real Time Data Prediction Contests. The following paragraphs discuss a number of advantages that can be provided by real time data prediction contests according to exemplary embodiments of the invention.

Real-time data prediction contests can merge the model selection capability of historical data contests with the strengths of live trading markets. However, there are typically two main challenges with real time contests. First, while the setup of real-time data prediction contests represents a much lower barrier to entry compared to existing live markets, it is a somewhat higher barrier than historical data contests. Participants in a real-time data prediction contest generally must maintain a real, live web service or by other means answer questions with little delay. However, participants are able to utilize various commercial and open source solutions that facilitate the implementation of a coded algorithm as a REST endpoint. Furthermore, the requirement that participants do more work (i.e., develop and maintain a model as well as exogenous data sets) is not, in and of itself, a drawback. An advantage of exemplary embodiments of the invention is that it allows participants to pass through more economic value to an end user of prediction than they are able to in a traditional historical data contest.

Another advantage of real time prediction contests is elimination of data leakage. In contrast to historical prediction contests, the answers to real-time contests lie in the future. This aspect of real-time data prediction contests completely eliminates a variety of data leakage present in historical contests. In particular, some participants in historical contests may use exogenous data causally connected with (or in some cases identical to) the contest data. Use of the exogenous data in an historical contest can make the models submitted by the participants worthless. Exemplary embodiments of the invention involving real time prediction contests do not have this disadvantage because use of exogenous data is a desirable objective that can enhance the predictive capability of the participant's solution. Real-time prediction contests free participants to use whatever ingenuity they possess in finding anything that can help them make better predictions, whether that means locating real-time sources of data or creating them from scratch.

Another advantage that can be provided by real time data prediction contests is the re-usability of contests. One contest can be used as a regressor for another, opening up options for combining and integrating solutions, as will be described further below. In their plurality, real-time contests can be described as a web of interrelated, bi-temporally indexed random variables available for use in the present without any modification: a canonical term structure for any desired prediction, as defined by the desired domain of application, e.g., a set of problems for which there is sufficient temporal or cross-sectional data that differentiation between good models and bad is possible on a reasonable time scale. Additionally, the interne of things (IoT) can be exploited to capture relevant sensor data in real time.

Another advantage that can be provided by exemplary embodiments of the invention is the ability to fragment tasks. Prediction tasks can be fragmented into smaller domains to improve accuracy and participation. For example, a contest to predict a stock market index over a long horizon would likely fall into the realm of traditional human oriented prediction markets and have no clear resolution. On the other hand, a contest to predict sales of individual items in hundreds of stores would be much more likely to unearth strong modeling approaches and sources of exogenous data. Hence, exemplary embodiments of the invention can be utilized to encourage the generation of strong models and data sources by fragmenting the tasks to a manageable size.

Other advantageous characteristics that can be provided by real time data prediction contests are timeliness and relevance. Real-time data prediction contests can provide an immediately usable product whose creation time depends on the amount of time it takes to accumulate enough data to differentiate contestants. Once created, the solutions generally do not lose statistical relevance. Contestants understand that in order to remain near the top of the leaderboard, and thus continue to receive compensation, they need to maintain their model and data sets so that they are timely and relevant. By contrast, the common task framework (CTF) in an historical data contest is primarily a research tool that has a long development time before it can be used commercially. With a historical data contest, there is a great divide between research and production, and due to timeliness of supplied regressors and rapidly changing business environments, a long running historical data contest may never directly impact the sponsor's business.

Another advantage that exemplary embodiments of the invention can provide is stability. Out of the intense and continuous competition comes stability, achieved through redundancy of the contestants and their solutions. If one successful participant ceases to provide answers, due to some unforeseen error in model or input data for example, it will make only a small difference to the ultimate consumer of the data because there are many other participants whose answers already contribute to the consensus. These aspects of a real time data prediction contest are not part of a typical software development life cycle and model review controls.

As noted earlier, exemplary embodiments of the invention can facilitate the process for defining a real time data prediction contest. For example, a potential sponsor of such a data contest can identify a source of updating data, such as might be available on a table in a web page or a public JSON page. Identification of the source of updating data may be much less involved than the process of setting up a traditional historical data contest, which typically involves both the collection of relevant curated data and contest design, including the avoidance of data leakage.

Real time data prediction contests may also provide the advantage of decreased costs. With increased accessibility of data predictions, more prediction and formalized decision making will be used. Increased access to crowd based prediction may result in a large amount of granular, individually tailored applications. As the availability of real-time random variables of high quality rises, the marginal cost of creating further forecasts on which these depend will drop significantly. Some low cost contests may be dominated by fully automated entries.

Real time data prediction contests also provide the advantage of enabling conditional prediction contests, including, for example, action-conditional forecasting for industrial control. Crowd-sourced conditional prediction may play a significant role in areas where control theory and reinforcement learning are now applied.

Additional components and features of exemplary embodiments of the invention will now be described, including design patterns that incorporate concepts from reinforcement learning, and utilize the creation of computation graphs that interweave and stack the contributions of different participants en route to an accurate real-time answer.

Design Patterns. Data ubiquity can be used to drive a new, lightweight information economy manifest as a collection of real-time contests. These might be thought of as a mid-point between continuously traded markets and historical data competitions. Because real-time contests provide incentive to find relevant data, and because it is very easy to create new contests, the real-time web described herein is likely to span many different industries, geographies and platforms.

The depth of the real-time web is another aspect of exemplary embodiments of the invention. As used herein, "depth" may refer not only to the use of deep networks in competitors' entries, but to the creation of computation graphs (e.g., networks) interweaving and stacking the contributions of different participants en route to an accurate real-time answer.

According to one embodiment of the invention, sub-contests may be used to enhance the effectiveness of a real time data prediction contest. Assume participant a in contest j receives a question at time $t_j^q$ and must reply with their answer by $t_j^a = t_j^q + \delta_j$. Arrival times $t_j^a$ are generally stochastic but not so the service response time $\delta_j$. The participant can establish a sub-contest k with question and answer times lying safely inside the interval $(t_j^a, t_j^q)$. For instance they can receive the question at $t_j^q$, post a sub-question at $t_k^q = t_j^q + \delta_j/10$, and require answers by $t_k^a = t_j^q - \delta_j/10$ which, upon receipt, can be combined with their own analysis to yield a response in time for the cutoff $t_j^a$ for the parent contest.

Participant a can assign prize-money for sub-contest k equal to some fraction of their own ongoing compensation in the top level contest j. This permits the participant to fragment the task in different ways according to their objectives and constraints. Participant β entering sub-contest k may have every reason to accept this arrangement even in the degenerate case where the sub-contest asks precisely the same question and participant α merely forwards participant β's answer verbatim. This is because contestant a might attach some added data such as lagged values, exogenous data, cleaned data or data comprising useful features to the question in the sub-contest, thereby saving β from time consuming work.

Alternatively, α may offer some other benefit such as free computation, curated library distribution, simple REST deployment or a desirable data science environment with back-testing capabilities. Failing that, participant a might merely provide superior marketing of the sub-contest than the parent or search engine optimization, or perhaps arrange superior access to an expert community.

As used herein, a "feature" generally refers to a submission to a contest that may be useful as a regressor but may not in and of itself constitute an unbiased estimate of the target. Features can be provided to participants in a number of ways. According to one embodiment, participants can buy features a la carte via a market mechanism adjacent to the contest. According to another embodiment, a meta-contest parametrized by a choice of link function (such as affine, rectified linear or logistic) can be implemented. The task of meta-contest participants is choosing how to use the link function to combine the most promising competition entries, and useful features, into an even more accurate response. A participant in this meta contest supplies a weight vector w, offset b and any other parameters as required by the link function. Their decision is based on the historical performance of contestants as they do not see the present values of entries until after the submission time $t_k^a$ of the child contest. The calculation is owned by the parent. This arrangement defends against the piracy concern: the participant entering the parent contest could easily enter the child contest.

Aside from improving the forecast in the spirit of ensemble methods, the weight contest may provide immediate transparency into the relative worth of features and entries submitted to the child contest—thereby boosting the efficiency of the feature market and, to use economic terms, helping to allocate resources to where they are, on the margin, most needed. Additionally, some entries in the child contest may themselves use sub-contests in which, once again, a blind weight meta-contest mechanic is employed. In this way combinations of contests may grow downward and begin to resemble neural networks. The perspective can be reversed. For example, if the participant begins with a well-trained deep network, establishing a weight contest could improve the final layer.

According to another embodiment, a contestant might arrange a subcontest to predict their own residuals. While superficially this is equivalent to supplying their entry as a feature, deep residual learning experience suggests that learning to hit zero can be easier than an arbitrary target. Here again the tree can extend downward. A contestant entering a residual contest can create their own residual subcontest and provide hints as to why they think their model can be improved. For example "I think my model is pretty good but my errors are high on long weekends." As participants sub-divide prediction or reconstitute it, they are slotting themselves into a "production line" version of prediction.

According to another embodiment of the invention, a "derivative" contest may use an underlying contest or exogenous market as target (i.e. solution). According to this embodiment, an action-conditional prediction contest is combined with an underlying unconditional contest, with the latter used to provide the target for the former. The underlying contest adopts the role played by a value function in reinforcement learning.

As one example, consider the optimization of baseball pitch choice and the following setup intended to solve this decision problem:

1. A prediction market for winning a baseball game, with continuous trading.
2. A underlying real-time data competition to predict end of innings win probability. At the end of each play contestants are asked to forecast the risk-neutral price immediately prior to the start of the next innings—as determined by the prediction market above.
3. A "derivative" real-time data competition to predict the post-play win probability (as defined by the consensus aggregate answer to the underlying contest above) conditional on pitch selection. Contestants are asked this question and respond before the play. They supply a vector as in Table 1 below.

TABLE 1

Sample response to an action-conditional prediction contest.
The target is the post-play consensus game winning probability
as defined by a second, underlying contest.

| Action | Response |
| --- | --- |
| Four-seam | 0.91 |
| Two-seam | 0.90 |
| Cutter | 0.90 |
| Forkball | 0.87 |
| Curveball | 0.93 |
| Slider | 0.85 |

The conditional contest may require all participants to provide forecasts for every eventuality, though in the example above there is a shortened pitch classification list for brevity. Contestants can only be assessed on one of their predictions because only one actual pitch is thrown. However it may be reasonable to assume that the predictive capability of participants carries over from one action choice to another.

Exemplary embodiments of the invention enable separation of concerns, in which participants with orthogonal expertise combine their skills. For example, one participant might have a firm grasp of game theory and possess great insight into the mixed strategy for pitch selection that trades off predictability versus exploitation. The participant may have some insight into the batter's psychological state or have an excellent model for game state transition conditional on successful contact with certain types of pitches. However, lack of an historical database might leave this same participant at a great disadvantage in predicting game results from post-play game states or end of innings scores. This baseline might best be provided by someone else participating in either the prediction market or the underlying end of play contest. The derivative contest does not require participants to estimate the probability of a particular action taken by the pitcher. This is analogous to the separation achieved by Q-learning.

According to another embodiment, temporal difference (TD) contests can be used. In this embodiment, the consensus crowd prediction in the underlying contest is denoted by $V(t_k)$, where $t_k$ indexes pitches. The prediction contest may be set up as follows:

1. A prediction market for winning a baseball game.
2. Underlying contest to predict end of innings win probability, as before. Responses are received after the k'th pitch and denoted $V(t_k)$.
3. Derivative (action conditional) contest to conditionally predict a weighted sum of temporal differences of future values of $V(t_k)$, in accordance with Formula 1 below. Rather than placing all the weight on the consensus after the very next pitch, the target is computed as:

$$G(t_k) = \frac{1-\lambda}{\lambda} \sum_{l=1}^{\infty} \lambda^k (V(t_{k+1}) - V(t_k))$$

where $V(t_n)$ is defined as the current state of the underlying competition (aggregate forecast) after time state $t_n$ if the game has not finished, or equal to the game result if $t_n$ extends to the finish of the game.

As an analogy to temporal difference (TD) learning, the competition parameter $\lambda$ controls the degree to which we believe we can rely on the first competition as gospel, with $\lambda \to 0$ representing full confidence in the underlying market and $\lambda \to 1$ ignoring it completely.

TABLE 2

Labels for action-conditional contests analogous to
temporal difference learning methods, and their targets.

| Contest | Effect | Target |
| --- | --- | --- |
| TDC(1) | Underlying contest only | Distant future |
| TDC(0) | Underlying and derived | Next underlying |
| TDC($\lambda$) | Underlying and derived | Compromise |

A compromise value of between zero and one may prove better than either extreme, and delays in payment implied by Formula 1 above need not be excessive.

Additional examples will now be described for aggregating the participants' responses as well as compensating the participants.

Meta Contests. According to one embodiment, the system employs a meta contest in which the crowd is used to predict the best predictions of the crowd. That is, the crowd itself can be used to opine on the efficacy and future efficacy of participants, and also the manner in which the consensus is derived. A meta-competition may be analogous to a meta-parameter in a hierarchical model. It may straddle a plurality of contests to avoid circularity and manipulation. The particularities of the contest and participant can be omitted to encourage a crowd-search for generally applicable consensus calculations.

Point estimate contests. According to another embodiment, a point estimate contest may be utilized. In a point estimate contest, participant i supplies only a single number $x_i(t)$, perhaps contributing to a consensus estimate $\hat{x}(t)$ for the customer. When the truth corresponding to contests $t=1, \ldots, T$ is revealed, the running mean square error is $$MSE(T) = \frac{1}{|R_T|} \sum_{t \in R_T} e_t^2$$

where, for brevity of notation, $e_i(t)=x_i(t)-t$. Due to delays in receiving the truth, this calculation may lag well behind. Here $R_T$ denotes the set of contests for which results are known at the time just prior to contest T. We can assign a consensus $$\hat{x}_T = \frac{\sum_i w_i(T) x_i(T)}{\sum_i w_i(T)}$$

using un-normalized weights $w_i(T)$. For example $w_i(T)=1/MSE_i(\mathcal{F}_T)$ where $MSE_i(\mathcal{F}_T) = \sum_{t \in \mathcal{F}_T} (x_i(t)-y(t))^2$ is the running mean square error for participant i's responses in contests who truth has been revealed thus far.

In time series contests, it may frequently be the case that errors $e_i(t)$ are serially correlated. One simple example is to down-weight contribution from participants with the highest serial correlation. There are other alternatives. For example, a simple, robust aggregation uses the median forecast from a high percentile sub-group of participants. Participants are compensated if they qualify for this calculation.

Likelihood Contests. According to another embodiment, a likelihood contest is utilized. In some contests participants respond with probability vectors for discrete outcomes. A means of scoring participants' entries is the posterior log-likelihood.

Implied Trading. According to another embodiment, a market inspired mathematical fiction may be used to determine compensation and aggregation. According to this embodiment, the real time data prediction system will:

1. Interpret participants' forecasts as wagers by augmenting them with an algorithmic optimal policy.
2. Use these fictitious wagers to clear the market, arrive at a risk neutral forecast, and also compensate participants.
3. Allow actual compensation to lag well behind (in time, and also in money by ensuring a draw-down to zero is highly unlikely).

Unlike prediction markets (e.g., actual financial markets), participants do not actually choose their wagers in this arrangement. They cannot ever lose actual money. And in no way can they be considered to be gambling. Market mechanisms are simply used in this embodiment to help elucidate the mathematics of their scoring, which might otherwise seem arbitrary. A concrete example is provided as follows.

Parimutuel Aggregation. The parimutuel system operates at most racetracks worldwide. Together with some laboratory economic assumptions, it motivates a scheme for both weighting forecasts and compensating participants. The parimutuel system simply allocates all wagered money to those who selected the winning horse (in proportion to amount bet, of course, and after a fee has reduced the pool). According to this embodiment, the participants are not wagering, merely doing data science, but as a convenient mathematical fiction their forecasts can be considered to be converted into bets in a systematic, disciplined manner.

Suppose I participants provide J probabilities. The parimutuel system provides incentive for log-optimal gamblers to bet directly in proportion to their subjective probabilities of each horse winning. For consistency, the notation Pij is used to denote the probability the i'th participant assigns to horse j and q the risk-neutral price that is identified with the aggregate forecast. The algorithm is shown in FIG. 11 and, as can be seen, involves matrix operations.

Real-time data contests can be viewed as an attempt to maintain the immediacy and incentives of a market mechanism without commingling prediction modeling with human decision making. Real-time contest design still generally needs a means of deriving a representative answer from the crowd responses and also a means of compensating participants who play a material role in its construction. These objectives can be met by building robotic investment decisions directly into the scoring mechanism. The setup then resembles a "robo-market" where participants have relinquished explicit investment decisions to an investment robot, though not the task of creating the estimates on which the automated investment decisions depend.

To further illustrate, the mathematical observation is made, without proof, that a log-wealth maximizing investor constrained to wager all of their income on every event will invest on each outcome in proportion to their subjective beliefs. Since risk-neutral prices in a parimutuel market are proportional to aggregate investment, we can make the further observation that in a parimutuel robo-market the market probabilities are merely wealth-weighted combinations of the subjective beliefs of participants. Thus, finally, we make the observation that the market effects a linear model on the subjective beliefs of the participants. The coefficients of this linear model are synonymous with wealth and updates to the model are precisely the wealth changes one would observe, say, at a racetrack. This leads us to the method shown in the algorithm in FIG. 11 which is an example, though by no means the only possible method, of determining both the compensation to participants and at the same time an crowd aggregate forecast q—the latter being the market clearing Arrow-Debreu price.

Generalizing the parimutuel scheme it is possible to: (1) interpret participants' forecasts as investments in contingent claims, by augmenting the forecasts with an algorithmic optimal policy, computed server-side on their behalf, that converts forecasts into these tiny wagers; (2) use these fictitious wagers to clear the market, arrive at a risk neutral forecast, and also compensate participants; and (3) allow actual compensation to lag well behind (in time, and also in money by ensuring a draw-down to zero is highly unlikely).

The domain of application may depend on, or rather be defined by, the effectiveness of deferred versus more immediate compensation.

As described above, exemplary embodiments of the invention can utilize a REST-based protocol for competitive yet collaborative forecasting, and various design patterns can be used to further facilitate a division of labor in data gathering, feature generation, model selection, meta-modeling and ongoing performance analysis. Exemplary embodiment can provide an online, redundant, constantly updating and collectively computed computation graph culminating in the production of a consensus forecast for a large number of variables of interest.

Additional features, applications, and embodiments of the invention will now be described.

Applications. Exemplary embodiments of the invention can be applied to a wide variety of industries which may need pricing, recognition, logistics, recommendation or bespoke forecasting in some form or another. From insurance and broker dealers to agriculture to manufacturers of handbags, most any industry category, or sub-category, or sub-sub-category may benefit from superior prediction and decision making.

Examples of applications of the invention to predict events are numerous and could include various commercial predictions such as: when a product will fail; what items a person will buy, whether a person will like a purchased item, what is the future price of certain components of a product, what is the optimal price for any item in commerce, what are the expected ratings of a TV show based on demographics of the audience, and so on. While initial implementations may be driven by commercial motivation, many educational, health, civic and scientific applications will benefit from improvements to the system, resulting from commercial applications. Engagement and system feedback arising from commercial applications will generate commonality in feature spaces across many real-time applications. For this reason, it is to be expected that the price of prediction will decline significantly over time, making the DSaaS system much more affordable as it continues to be implemented in various applications. Other events that may be predicted include: does a person need emergency assistance for a heart attack; is a person having a seizure; is a person in the early stages of Parkinson's' disease; what is a person's heart rate based on a high resolution video; what is the train arrival time (e.g., based on GPS data of its passengers' mobile phones); which traffic intersections are most likely to have accidents; where is the optimal parking spot; what is the optimal traffic signal timing; what is the optimal initial asking price for selling your house; what train door should I enter to maximize the chance of getting a window seat; when will a bridge be unsafe and in need of repair; what is the optimal recommended tip amount to maximize tipping in a restaurant; what is the likelihood that a savings account holder will close his or her account if the bank does not follow interest rate hikes, and so on. There are numerous other examples where predictions can be applied, including in risk, compliance, trading, operations, security, real estate, credit card services, banking loans, student loans, auto loans, investment management, private wealth management, merchant services, middle marked banking, commercial term lending, human resources and technology, etc.

These tasks fragment into small data science problems, from the choice of text in a reinforcement letter to highly specific predictive maintenance for a vehicle part. And typically there will be enough streaming data associated with these problems to distinguish good predictions from bad quickly. Most every business faces data science problems in sales forecasting, direct mailing, repeat shopping, satisfaction, on shelf availability, competitor pricing, conditional sales, review management, call center operations, pickup and delivery, occupancy prediction and product recommendation, for example.

Healthcare applications may include genomics, microfluidics, imagery, inventory, equipment monitoring, patient monitoring, behavioral campaigns and many other applications. Other applications that can benefit from a prediction web may involve wheat fields, oil rigs, combat, combinatorial chemistry, production line optimization, robotics, procurement, voice logs, expedited delivery, spoilage, loyalty, component costs, recovery logistics and countless other commercial activities. To generalize, any number presented on an app, an enterprise data feed, or a trader's desktop may be automatically replaced by a forward looking term structure for the same.

Enhancing weak, universal data feeds. According to exemplary embodiments of the invention, it is possible to create a large number of highly relevant nodes in short order. This does not necessarily require an equivalently large number of data sources, due to the notion of a weak universal source and the ability of the prediction web, as described herein, to strengthen them. The key observation is that good data can be a highly competitive predictor of bad data.

Real-time contests can turn weak data into strong, dirty data into clean, and intermittent data into continuous in much the same way that continuously traded stock prices effectively convert a mix of lagged accounting data into a forward looking estimate. In contrast, it has generally been the case in traditional contests to work hard to ensure the target is of high quality, the rationale being that answers that are noisy, frequently incorrect or lacking in authority might dissuade earnest effort or fail to align with scientific goals. It would likely be incorrect, however, to apply that logic to the context of real-time contests with much lower startup costs, where feature spaces and alternative data sources are generally an important aspect.

Universal text feeds. According to one embodiment, any sufficiently broad source of text data can be a universal data source insofar as n-gram prediction (or more sophisticated variants) can be used to promote the location of higher quality data sources. Consider, for ex amp l e, the frequency counts in a large corpus of streaming data for the phrases "bridge traffic," "trump resigns," "blackout," or "GE raises capital." These counts are very far from definitive ground truth and may easily represent anything other than contemporaneous truth: gossip, false reports, historical commentary, and so forth. However it is reasonable to assume this weak data source is nonetheless correlated with reality, and may be sufficient incentive for participants to locate, interpret or even create stronger data sources from inexpensive WiFi enabled sensors. The value to the sponsor of such a contest, or the community at large if it is public, is likely to be far greater than the prediction of the weak data source per se.

Establishing a contest to predict n-grams in weak data sources (such as the free version of Twitter, to pick a concrete example) canbe established automatically by a bot looking for good data sources with a view to winning money in other contests, as will be described further below. Good mechanisms for encouraging a division of labor, as discussed below, can further facilitate the creation of a nutrient rich environment for a species of specialist text mining bots whose purpose is ensuring that the incremental lift to prediction provided by alternative data sources (which today is a mostly labor intensive, bespoke activity) is realized whenever applicable.

Location Data. According to another embodiment of the invention, personal location data prediction can provide valuable information, even if it pertains to a relatively small percentage of the population. Often this comes attached to free text data generated by users on their phones, and can signal a variety of highly specific intents. Are you running because it is raining? Are you inside a nightclub or waiting outside? Yet it may be very difficult for any one company to fully monetize this data, since in the absence of a statistical contest the incremental economic value for any given prediction is largely unknowable in advance. It is likely, therefore, that this will instead be accomplished by bots, as discussed below, perhaps using cryptographic methods to avoid invasion of privacy.

One method for generating a large number of weak data feeds (and thereby a large number of strong data feeds in contests) is the joining of location data against databases of interest whose attributes include GIS coordinates. Every column of any such database is a potential contest. For example, a database containing locations of libraries is a real-time contest for library usage, and so it goes.

Data Cleaning. In accordance with the concept that good data sources are useful in predicting bad, we consider the special case of data cleaning. With some help from design patterns discussed below, bad data sources can be enhanced in surprising ways. But most all data is dirty, and most dirty data is subject to some means of data cleaning, usually with humans in the loop. The human data cleaning process, whether or not it is already assisted by technology, creates a time series, albeit a slow moving one in some cases.

If there is sufficient cross sectional data to distinguish good prediction from bad, or sometimes even if there isn't, a real-time contest to predict likelihood of a data point changing can draw attention to the need to do just that. It matters not that algorithms which identify the ground truth weeks or months before the humans catch up will sometimes be only belatedly rewarded.

Enhanced Market Data. In asset management and financial markets there are many examples of time series whose prediction, if done extremely well, is relatively easy to monetize. Several platforms exist to crowd-source predictions and trading strategies. Typically these specialized platforms provide curated historical data and back-testing libraries tailored to, for example, equity markets. These can provide a level of convenience for the model builders not available on a minimalist, more generic real-time contest setup. It might even be tempting to assume they obviate the latter.

But in fact that cannot be true given the limited number of input data feeds and the statistical quality of those that are provided. There are very few data feeds that can be considered first moment complete in the sense that their future state, or even average of future state, is easy to discern or even intended to be easy to discern. The two possible exceptions to this rule are market prices themselves, whose average future value is embodied, more or less, in the current value, and evaluated prices provided by vendors (also intended to represent the value of a security). In fixed income markets the latter plays a surprisingly important role.

Discerning the probabilistic term structure of these market data feeds is non-trivial and worthy of real-time contests. Indeed, setting aside the richness of the feature space and auxiliary quantities not supplied that might be predicted (such as volatility) there is an opportunity to enhance the value of market feeds because vendors can't even supply an accurate first moment.

An evaluated price for a bond provided by a vendor may not be a good, or even a mediocre, statistical estimate of its future value. Evaluated prices are not martingales, nor trivially converted to martingales (by coupon adjustments, pull to par, convexity, carry or other easily accommodated deterministic adjustments).

It follows that any market data feed can be expanded from a single contemporaneous point into a richer feature space by means of real-time contests, provided there is sufficient cross-sectional data to distinguish good contestants from bad quickly. The same goes for boutique and obscure data sold to market participants, and even for intermediate results such as features derived from non-numeric data.

Thus, according to one embodiment there is a simple recipe for generating an almost limitless number of applications of real-time prediction markets: find two parties, one of which sells streaming data for the other to use in predicting markets, and enhance that streaming data. Moreover, if data exogenous to markets but causally related is a target for price discovery (of a sort, in real-time contests), because of the ease with which prediction of the former can be monetized, then it is apparent that data directly defining financial securities, or investing parameters, or otherwise embedded in the mechanics of trading securities will also be more directly traded in the same sense. A prime example is the use of indicative vendor prices in the daily calculation of net asset values for exchange traded funds that hold bonds.

Closely related to the enhancement of market data feeds are societal and regulatory priorities in the monitoring of markets. The evolution of the prediction web may, in some cases, result in unexpected juxtapositions of this new best practice against estimates of quantities that are not only mediocre but subject to ingrained bias. That will be advantageous where, due to historical happenstance, inertia, moral hazard or the unintended consequences of regulation (sometimes all four) forecasts or probabilities, prices or scores that have come to be relied on have been shielded from even the smallest restoring force usually provided by market forces.

Hence, real-time nano-markets (which might be the preferred terminology when many tributaries feed eventually into an easily monetizable market prediction) can provide a new, resilient variety of transparency precisely because market forces replace model assumptions in parameters, meta-parameters and so forth which might otherwise be subject only to the much weaker checks and balances that may be utilized traditionally.

Interestingly, the approach taken by regulators of financial markets has been philosophically opposed, by accident in part rather than design, to the kind of strength which arises from a mesh of interleaved contest streams where large, important predictions are supported, as described herein, by a succession of ever smaller ones. Instead, there may be a subjective, unevaluated and often ad-hoc choice of a parameter or meta-parameter made by an individual regulator. By assigning fixed regulatory costs to markets and in many cases outlawing them, a very different geometry for probability has evolved that seems counter-intuitive. Massive trillion dollar markets exist without any nearby support, save the bureaucratic, ceremonial patrolling of statistics referred to above.

Compensation. Other embodiments of the invention provide methods for distributing prize money to participants in a real-time contest. One challenge is the arrival and departure of participants, and another is the restriction that permits real-time contests to be categorized as contests: participants do not make deposits.

Absent the first requirement, many setups are possible. If all participants answer a common set of questions then an accuracy metric can be selected by the customer. For example, the R package ml_metrics and similarly named python package ml metrics provide an enumeration of scoring rules. Examples for point estimates include mean absolute deviation and root mean square deviation. If quantities vary over several orders of magnitude Root Mean Squared Logarithmic Error may be more useful. For probabilistic forecasts, log-likelihood is one example of a method that can be used for scoring.

Aggregation. If participants answer every question, the creation of a consensus point estimate, which may be convenient for the sponsor, can be readily accomplished. For instance if we assume that contributed forecasts are unbiased (or adjust them) then a precision weighted average of contributions is an example of a useful consensus point estimate.

In time series contests, it may frequently be the case that forecast errors from a given participant are serially correlated. One simple example is to down-weight contributions from participants whose predictions exhibit the highest serial correlation. For example an equivalent number of independent observations can be determined. There are other alternatives such as a simple, robust aggregation that uses the median forecast from a high percentile sub-group of participants. Participants are compensated if they qualify, or perhaps if they come close, depending on the preference of the customer for resilience over accuracy.

Where forecasts apply to the medium term and where forecasting is fundamentally difficult (such as with predicting market prices or quantities inferable from the same, in part) there may be reason to be cautious about employing overly sophisticated methods. In the context of real-time prediction contests driven by new types of quantification including WiFi-enabled sensors, there may be as many useful schemes for aggregation as there are multivariate prediction methods, motivating a meta-contest as described below. Where necessary the meta-contest might straddle multiple contests in order to shed light on questions such as which schemes are robust enough to outperform simple averaging.

Ensemble learning and inverse probability weighting may be used in connection with data streams. In spatial contests the crowd will, or can, perform multi-sensor data fusion. As with a hierarchical Bayesian statistical model, to draw an analogy, the relative time scales on which predictions and meta-predictions are made and evaluated will typically be an important part of overall design.

With respect to compensation, all prize distributions with the same aggregate cost to the sponsor are not necessarily created equal. For example, offering a single grand prize may be a more effective motivating factor for participants, as compared with multiple smaller rewards. However, there is a potentially detrimental impact of winner-take all markets on stability and innovation. Choice of compensation is a control problem, not just a forecasting problem, since the choice of aggregation and compensation is an action that will impact whether contestants enter, succeed and persist. One might contemplate using the methods described below, i.e., crowd-sourcing the compensation rules and how they should change on an ongoing basis.

A key challenge, however, is how best to compensate participants or provide a consensus forecast if some are recently arrived or fail to answer some questions. One solution would penalize missing answers going all the way back to the time at which the real-time contest was established; however, this approach may be perceived to be penal. Alternatively, the contest could be periodically reset and scoring could consider only those participants present for the entirety of an epoch. Another example would use imputation of missing answers, which would be less punitive and in some cases straightforward to implement. According to another example, participants are allowed to choose imputation formulas based on contemporaneous forecasts by their peers, such as defaulting to an average of other contributors forecasts.

A different class of solutions may be modeled after market clearing mechanisms. According to this embodiment, forecasts provided by participants are characterized as nano-investments in contingent claims that permit a market clearing mechanism to be defined and payouts made when the future out-come is resolved. This can simultaneously perform compensation and aggregation. The payout updates a fictitious bank account for each participant and the Arrow-Debrew prices constitute the consensus forecast probabilities.

The elegance of this last approach is that self-financing markets are ubiquitous, intuitive and generally regarded as efficient. Compensation is incremental since every prediction results in a small gain or loss to a running wealth account, and the participant can eventually "withdraw" either voluntarily or involuntarily. Although the scoring calculations are moderately more complex than in straight historical contests, the overall scheme is philosophically clean and difficult to manipulate.

Parimutual aggregation is another compensation method, as was described above.

Ecology. According to exemplary embodiments of the invention, the prediction web described herein comprises a mesh of random variables spanning the future, each one the outcome of never-ending competition. Rather than standing in isolation, as with historical contests, the nodes can be stacked and combined in many ways. Evolving relationships are established between them.

The following discussion explains the different styles of algorithms which may make up the densely interconnected real-time contests, ultimately feeding off the economic value delivered to end users and the prize money provided by sponsors. In this embodiment, the contests may blur the distinction between programmer and program.

Robos. "Robos" refer to algorithms which perform most or all of the model selection procedure absent human intervention. The term robo seems appropriate at the meta-contest level especially, since the meta-search is automating the blending of contributions. Analogously, robo-investing is taking over portfolio construction for many individuals looking for a low fee management option.

Automated machine learning (AutoML) is a burgeoning field with many active workshops at major conferences. The R package Caret was designed to streamline the process for creating predictive models by standardizing data splitting, pre-processing, feature selection, model tuning using resampling, and variable importance estimation. Caret brings together over a hundred and fifty disparate machine learning and statistical approaches under a common interface. The full list is provided by the authors at GitHub.

Caret and similar automated learning projects, such as Auto-WEKA can be used to implement meta-search. Data Robot provides solutions for streamlining model meta-search. As the name suggests it can be a useful tool for creating robos. Driverless is a product from H2O software with similar goals. Neural Algorithms is an example of a smaller company promising other solutions. Some modeling approaches use a large function space. Eureqa, DataMelt and HeuristicLab are companies having symbolic regression capability for which there is a significant literature and intellectual ancestry. Open source versions al s o exist, such as GPLearn and FFx.

A slightly different approach exploiting genetic programming is offered by TPot: a Python library that automatically creates and optimizes sklearn machine learning pipelines. Some approaches are suitable to time series, others to images.

As discussed below there is a fine line between robos and good, adaptive models with their accompanying estimation procedures. The continued study of meta-learning and, in some cases, convenient drop-in improvements to hyper-parameter optimization (both commercial and open source) will make it increasingly easy to populate real-time contests with strong automated entries, thus driving the traditional model tweaking cost towards zero and opening up competition among the meta-algorithms.

It is already the case that AutoML contests help research, and some historical contests have focused on meta-learning. However the corpus is still relatively small and it is reasonable to presume that Bayesian and other methods for hyper-learning could receive a boost from the establishment of a large number of commercially significant real-time contests.

Sentinels. It will be apparent to one skilled in the art that a combination of spiders and robos may lead competitive forecasting. A bot that can search exogenous data and also model hyper-parameters can compete, and may do so even in the presence of small amounts of prize-money (or none). As used herein, "sentinels" may refer to a new form of artificial life that combines many or all of the capabilities of spiders, robos, trolls and brokers mentioned below. Sentinels are bots that automatically enter real-time contests, perform meta-model search, and spider for relevant regressor data to improve their own performance. New contests will be rapidly covered by a multitude of these entities as soon as they are posted. Once scale has been achieved, sentinels may become endemic to large webs of real-time forecasting contests.

Like trolls, sentinels are able to automatically enter contests. But like robos they possess sharper capabilities including robotic meta-search of models. Like spiders they accumulate data from various sources. Once suitably successful they can even create their own sub-contests, sell themselves, or retain humans for manual labor. Sentinels may solve the time to market problem emphatically. When a new contest is added, a sentinel can immediately detect the existence of a possible food source, track down the contest, attach itself and quickly determine if the new revenue stream justifies the computation cost.

To maintain competitiveness the sentinel may constantly survey existing data sources and related contests. They will looking for mutual information, test for Granger causality and search features spaces and variable transformations for whatever might be useful. An example of a sentinel is an algorithm that maintains a list of contest variables that have proven useful regressors in the past, then applies some version of regularized regression to a new contest, such as Lasso. Using strong rules, Sentinels may quickly pre-process new contest and data sources as they arrive without undue computational burden.

Specialists. Any vibrant economy will contain its fair share of niche players.

Turks. Some prediction tasks will require manual data entry or human intervention. There is nothing preventing participants from writing bots to hit Amazon Turk, Crowdflower or any number of crowd-sourcing sites serving as programmable interfaces to humans.

Emus. Emus search contests for participant entries that fail to perform well but accidentally have use elsewhere.

Trolls. Trolls may comprise any program capable of entering contests programmatically, though not necessarily capable of performing terribly well over time. Trolls may be mostly an annoyance and a small tax, though they can alternatively be seen as serving a purpose by encouraging good contest design.

Miners. Miners may comprise specialized programs that only enter a sub-class of "performance" contests. Those are aimed at enhancement and outsourcing of well understood but computationally burdensome algorithms. Miners will typically use graphics card processing, specialized hardware or, sometimes, novel approximation algorithms. A specific variety of mining, one in which fast approximations for batch algorithms are lured, is considered below.

Readers. Readers are sentinels that specialize in converting the text of a contest description, and associated search results, into a series of n-gram prediction sub-contests, as discussed above.

Stalkers. Stalkers are similar to readers, but comb through personal location data rather than free text. Foot traffic is a predictor of virtually all commercial activity, but also social activity. As will be appreciated by those skilled in the art, many things can be inferred from collective movement. Stalkers need not be as sinister as the name implies. Cryptographic methods can be applied to preserve privacy and offer users of location tracking apps a better compromise between invasive use of data and the benefits they receive by giving it up. Statistical methods such as differential privacy can also be employed, and aggregate statistics can be constructed that provably do not reveal the existence of any given person in a dataset.

Brokers. Brokers, typically cyborg, match contests with algorithms for commission on earnings. They can play an important role in private data applications as discussed below. Dealers help resell algorithms for external use, and can be used to implement a "push" model similar to analytics storefronts. Dealers may be human or cyborg. Algorithmic dealers might take a plain text description of a problem and suggest similar problems, relevant algorithms, historical performance and so forth.

Head-hunters. Closely associated with the dealing of algorithms is the recommendation of their human creators for full time employment, contracting work or task-specific private contests.

Privacy. Real-time contests for public data forecasting can create a vast collection of readily combined random variables, each representing the world's best predictions. What is more challenging is the mechanism by which companies can best utilize this resource for analysis of their own private data, data they may not wish to make public in whole or part. In the private firm environment, data is separated by firewalls and commercial data sensitivity presents a primary challenge to crowd-sourcing. There are methods, however, for coping with challenges in use of private data in a crowd-sourcing context, as will now be described.

Disguising Intent. Most of the concerns about leakage of information to competitors surround the data that is supplied to contestants (participants). However it may also be necessary to conceal commercial intent in the definition of the contest target or compensation scheme. For example, a company with no previous connection to transport that runs a contest to predict train arrival times may be revealing confidential information. A hedge fund may arrive at a key statistic it believes is critical to predicting a sector, but asking the crowd to predict this may betray a known causality it previously considered a trade secret.

However, the same mechanics that facilitate fragmentation of real-time prediction and control can also help disguise intent where needed. In particular, the use of feature markets and blending contests discussed above provide competition designers with a useful technique: they need only ask the crowd to predict quantities that have similar features to the secret quantity of interest they truly care about. Moreover they can tie feature markets to numerous different prediction contests to ensure a rich set of features is discovered by the crowd.

For example, suppose a hedge fund considered the relationship between particulate matter in New York City and same day equity returns to be a trade secret. Rather than directly ask for predictions of recorded air pollution the hedge fund can instead ask the crowd to predict anything else causally related to the same, such as hospital admissions for asthma, recorded crime levels, the grammatical complexity of public speaking, performance on standardized tests, light sensor readings, temperature, solar electricity generation, or Citibike trip duration. It is very likely that particulate matter readings will be relevant to one or more of these contests.

This approach can offer important advantages. Not only does the hedge fund in question disguise the intent of the contest, but it may also discover additional regressors it had not previously considered. The onus still lies with the hedge fund to conduct the final modeling itself, but that can still be achieved using numerous other methods discussed herein.

FIG. 12 illustrates examples of methods for defense against misuse of data supplied to participants (or not supplied as the case may be).

Theft and Piracy. Another privacy concern to be addressed is theft. A vendor of a commercially valuable data feed might not want participants to use or resell a stream of data they receive for free as participants. These actions would typically run counter to agreements signed by participants and would be subject to legal recourse, but purely legal defenses will not satisfy many users.

For some uses it will be advisable to aggressively subsample the data stream so that no participant receives anything close to a complete feed, thus removing the temptation to use a competition entry as a substitute for a commercial subscription to a data feed or at minimum, requiring somewhat elaborate arrangements involving multiple identities to achieve this. Anyone found doing this could be blocked.

Contamination of the data with a small number of erroneous data points may also deter unpaid commercial usage. These data points would not count in the assessment of participants, but they would come at a small price since calibrated models would have to account for this additional noise.

As a less invasive alternative, steganography can be used to make statistically insignificant yet traceable changes to the data, enabling a subsequent investigation to identify the precise participant who was the source of the stolen goods. Together with reasonable steps to know your data scientist (such as requiring login by Linked-In account with minimal vintage and details) this can provide a reasonable deterrent. Since the investigation or blocking of participants is a time series, a meta-contest can be run to assist in identifying and eliminating nefarious activity. All of the techniques mentioned in the following sections are stronger, and can also be used to address this concern.

Privacy. Privacy concerns can be categorized as the fear that any of the data is misused, as compared with all or most of it (piracy). The above-mentioned procedures can be used, but may be inadequate for some commercial purposes. More aggressive data transformation and obfuscation may be employed, though this may come at a price. It is unlikely to adversely impact "pure" model search entries (which will make their own transformations of the data anyway) but may hamper the use of exogenous data and possibly prevent participants from gaining a good understanding of the problem. Alternatively, a carefully curated allowed list of participants can be vetted by the customer.

Bootstrapping can be used to drown out the actual data in a sea of artificial points. However, this requires the identification of invariants in the data or some preliminary estimation of a generative model. It is also possible to use methods applied where the data is considered "secret," as described below, which are likely to be the most promising approaches.

Secrecy and Chumming. "Secrecy" generally refers to the highest level of data security concern, on a par with national security. In this case, the impact of possible data theft or misuse may be considered so serious that extreme measures should be taken. In a preferred embodiment, no human participant is ever allowed to see a single real data point. This would seem to be a show-stopper for crowd-sourcing, but only in the usual sense of crowd-sourcing.

Recall the vision of a large number of canonically designed, machine-readable contests and programs which can seek out suitable contests, enter them and retain competitiveness through periodic meta-model searches and monitoring for related variables. These programs can provide a means for dealing with private data. For example, the data privacy problem can be solved by means of chumming and cloning. Private data can be used to create entirely different but representative contests on the public side mirroring the style but not the content of private side contests that the sponsor truly cares about.

According to one embodiment, bootstrapped public contests can be used as bait for robos and sentinels. They are designed to draw in a class of algorithms satisfying the signature of the class at hand, but also capable of adapting to new unseen training sets and time series without further human intervention. Sentinels entering this specific type of lure contest must agree to cloning and reuse of their algorithm on data they will never see. According to one embodiment, such programs are developed in one or more standard languages and environments (standard library packages, for example, approved for the classified use and replicated in-house). In this way, sentinels can participate in private data contests without any information passing back to the authors of the sentinel. They have knowledge of the commercial arrangement but do not watch or participate in the private contest.

For some applications, a strict event horizon can be imposed. While it may seem advantageous to allow sentinels working on private data to create public contests to assist in this task, this would allow propagation of information back to the public sphere. Similarly, sentinels entering public contests could all too easily rebroadcast data openly or via steganography.

The term "chumming" can be viewed as analogous to human recruiting, and real time prediction contests may be viewed as recruiting exercises. Real-time prediction contests may involve (a) recruiting human talent for use on private data; (b) recruiting relevant algorithms; (c) recruiting robos and sentinels which adapt and learn, and can be used on private data; (d) recruiting exogenous data (that predicts); and (e) recruiting uses (data that is predicted). Discussed below are a special case of chumming (inference) and details of an iterative scheme that successively improves the relevance of simulated data used to attract algorithms (boosting and synthetic data).

Online algorithms. The discussion above addressed the use of approximation contests. This technique can also be used to convert offline algorithms (intended to consume the entire data set or a large window of the same) into efficient incremental approximations suitable for real-time use. As used herein, "online" generally refers to the statistical meaning, as in "incremental" or "recursive." In the ideal case, an online algorithm can process a single data point at a time. The distinction between online versus offline algorithms can be illustrated by the following examples listed in increasing order of complexity: (1) a counter incrementing, (2) a running mean calculation obviating a complete recomputation when one more datum arrives, (3) the recursive least squares algorithm can take an existing solution to a problem for n data points and augment it for the n+1'th; (4) the Kalman filter, also used as an example below. These are clean examples with convenient exact solution intended only to demonstrate the potential computational savings. However there are many instances where online versions of machine learning algorithms are complex.

Motivating online approximation with Robos. According to one embodiment, Robos are search algorithms intended to automate not only the estimation of parameters within a family but also comparisons across very different approaches. It may be desirable to leverage all this work in an online, time series setting. However, where time series analysis is identified with supervised learning in order to take advantage of tools like Caret, the solution found is likely to be inefficient. This is because the solution will typically need to be recomputed from scratch using the entire window of data each time, even though the window may only be updated incrementally, for instance with the addition of a single new data point and the removal of the least recent. In very few cases are online versions of the algorithm provided in the underlying libraries either for estimation or prediction. For example, there does not appear to be a Caret-like package aimed specifically at a common interface for online models. However, online algorithms can be important. For instance, the online Kalman filter and its varieties are so widespread we are tempted to forget they have offline equivalents available (such as via the relatively obscure Duncan-Horn representation of the Kalman filter). This status is not likely to change quickly. For example, an online version for something as mainstream as Lasso regression has been proposed but will not feature in standard packages and may remain an active research area for some time.

In machine learning, there is a bifurcation between feed forward neural networks, which are well understood, and recurrent neural networks (decidedly less so). The same is true of Bayesian networks and graphical probabilistic algorithms in general. Though improvements will be made we expect a steady state where offline algorithms are better cataloged, more plentiful and easier to use than online algorithms. The reasons run deep. Clean online algorithms that everyone can agree on for standard libraries are usually rooted in conjugate distributions, but there aren't that many of them. Fundamental limitations in the building blocks of online versus offline algorithms suggest that the practical matter of converting one to another is not likely to be solved in a definitive mathematical way. On the other hand there are numerous ways in which good approximations may be built for any given purpose, for example by approximating prior and posterior distributions by mixtures of conjugate distributions.

Motivating online approximations with limitations of development tools. Theory aside, online algorithms can be harder to develop and debug. Data frame packages such as pandas or equivalents in Python, R, Julia and other popular languages generally do not support streaming updates. Iterative development environments such as Jupyter, R-studio, Beaker and IPython notebook are also written to support experimentation in batch, as are their commercial analogs in Matlab, Mathematica and more specialized statistics environments. Real-time event driven equivalents present challenges for design and use, and though clever attempts have been made they are not nearly as widely adopted.

Crowd-sourcing online approximations. It is not likely that the challenges of complex state management and real-time development can be easily avoided. But there is a practical solution that is in keeping with the spirit of production line data science and separation of concerns. For example, one participant could quickly develop an algorithm that works effectively on a long time window of historical data points using, for example, known meta-search packages. That participant could sub-contract a competition for a fast approximation. The round trip would work as follows: (a) participant A receives a question in contest 1; (b) participant A determines the computation required and posts as a question to contest 2 which they have established with a slightly tighter response time than contest 1; (c) participants B, C, D, . . . , Z respond to the contest 2 question; their results are aggregated, for example as the median of the top five best performers; and (d) participant A receives the aggregate result, and converts it back into an answer to contest 1.

Initially, participant A would rely on their own algorithm, perhaps at significant expense. They could not initially expect to rely solely on the sub-contest because the accuracy of responses would not be known. However over time they could gain confidence and eventually rely on sub-contest approximations for most of their answers. Their own, inefficient algorithm would then be relegated to a supervisory tool and used just enough to keep the sub-contest participants honest.

Transliteration and timeless code. In the foregoing example, participant A might decide, at their discretion, to disclose complete details of their desired calculation and even the offline code they use to evaluate the task. Quite often, for example, bottleneck computations can be separated from more proprietary logic. Complete transparency may encourage the development of clever transcription bots from one language to another. Another approach may take existing Python code and automatically add numba decorators. Or automatic differentiation libraries could be put to good effect. What is notable about this setup is that participant A is able to write code that doesn't go out of date. The task of maintaining the best version of this algorithm, in the most suitable language, running on the most economic hardware, is left to the other participants. In this way human designers can be lifted to a higher, purer, mathematical level of abstraction to the extent that the task permits. But the same may be true of sentinel creation, as will now be discussed.

Self-optimizing sentinels. Few things would help populate the ecosystem better than a domain specific language or other easy to use high level tools for sentinel creation. Consider a mature contest in which most participants' code is written in C++ or more efficient alternatives, as dictated by the competitiveness of the contest and the relatively small amount of prize-money on offer (relative to computational cost). It may still be possible for a sentinel written in a high level language to break in. A sentinel capable of excellent meta-search could find a superior algorithm that leaves it high on the leader-board, albeit not high enough to justify computation cost. Similar considerations apply to expensive algorithms such as those using Markov Chain Monte Carlo for estimation. Having established the feasibility, modulo computation, the sentinel could outsource a fast approximation and offer twenty percent of the earnings to the mining competition. Whether the initial computational investment is worth the risk is a prediction problem. It might one day be handled by specialized brokers. There are likely many innovative bootstrapping and maintenance ideas that can be utilized. It is possible, for example, that robos and sentinels can outsource their own human maintenance on sites like Freelancer.Com, using the API's provided there.

The following section describes a special case, incremental Bayesian inference, in more detail.

Inference. The tension between generative and predictive modeling approaches has been described above. Much of the subsequent description has focused on the predictive approach. However, there may also be advantages in using a specialized form of contest that highlights the importance of the generative modeling approach, even though prediction remains a primary aspect of the system according to exemplary embodiments of the invention.

Key observations were made above in describing chumming: the luring of algorithms to a public contest so that they may be used on private data, and more specifically where mining is specialized for the creation of efficient online algorithms. Chumming online algorithms can now be described in a specific way: the prediction target will be the ground truth of a generative model. To make the discussion more concrete, we revisit the seeming dichotomy between inferential and predictive schools of thought with a specific example.

According to one illustrative example, noisy measurements $y_t$ arrive at a sensor. A statistician seeking to understand the system might posit a simple linear Gaussian system in which an underlying truth $x_t$ following Brownian motion with time step variance Q is corrupted by white noise $\in_t$ with variance R. The generative model:

$$x_t = x_{t-1} + u_t \sim N(0, Q)$$

$$y_t = x_t + \in_t \sim N(0, R)$$

where successive $u_t$ and $\in_t$ are independent admits efficient inference in the form of the well-known Kalman filter:

$$P_t^- = P_{t-1}^+ + Q$$

$$K_t = P_t^- / (P_t^- + R)$$

$$x_t^+ = x_t^- + K_t(y_t - x_t^-)$$

$$P^+ = P^-(1 - K)$$

where x and P are running estimates of the truth (mean and variance respectively) and the −, + superscripts indicate values immediately before and after the measurement is registered.

Due to the existence of the mathematical shortcut provided by the Kalman filter, the statistician has not only performed inference but also prediction. If sensor data were to be supplied that included the true values for $x_t$ and not just the noisy observations $y_t$, the statistician would we very well placed to predict this ground truth. Indeed, even if it should turn out later that he or she was wrong about the noise distribution, he might nonetheless have "accidentally" arrived at the best linear estimator. In this sense the distinction between the two schools of thought can be dropped.

Imperfections and pragmatism. Suppose that upon using this solution it is evident to a statistician that the realized $\in_t = y_t - x_t$ are serially correlated. He might be tempted to adjust his generative model:

$$\in_t = a\in_{t-1} + \sqrt{1-a^2}n_t$$

for independent $n_t$ but perhaps would have to invest time arriving at the corresponding inference even though he would suspect, this being a linear Gaussian system, that a remedy must exist. After some work he might arrive at $$P_t^- = P_{t-1}^+ + Q$$

$$K_t = (P_t^- + Q) / (P_t^- + Q + (1-a)R)$$

$$x_t^+ = x_t^- + K_t(y_t - x_t^-)$$

$$P_t^+ = P^- + Q - K_t(P_t^- + (1-a)R)$$

where a is the AR(1) coefficient in the serially correlated errors.

The statistician would probably want to verify the solution against lengthy simulations just to make sure no algebraic error had been introduced. To a degree, this process can continue. The generative model may be altered as it pertains to the dynamics of the presumed underlying truth $x_t$. A third process may be introduced to accommodate regime changes, and so on. Eventually, the statistician will, in his efforts to find inference calculations for every reasonable generative model he finds plausible, be severely limited by his either his own dexterity, accumulated knowledge or ability to search literature in reasonable time. He may even run up against no-go theorems for conjugate families. In practice, there is a temptation to abandon the inferential approach at this point.

And even if the statistician persists, there is considerable work ahead. His calculations may eventually bear fruit, though even if he is successful in devising an inference solution, exact or approximate, it would be inadvisable for him to place the algorithm into production usage prior to rigorous testing. A careful workflow would typically include, at minimum: (1) implementing a simulation of the generative model (typically easy); (2) implementing an inference scheme for the same (almost always hard); (3) verifying correctness of the inference numerically for known parameters (tedious); (4) devising an estimation scheme for the parameters (almost always very hard); and (5) verifying in lengthy simulations that the estimation is consistent when the assumed generative model is used to generate synthetic data (again, tedious).

Inference contests. In view of these pragmatic difficulties, a division of labor can be utilized in which the statistician performs only the first, relatively trivial step of five. He uses his generative model to populate a family of real-time contests. They are all the same except that each contest utilizes slowly time varying parameters with a mixing time on the order of, for example, T/2 where T is a window length suitable to the task.

Contestants will be provided with measurements $y_t$ and judged against the underlying truth $x_t$. However the ground truth will be quarantined for T»1 lags so as to only be indirectly useful to participants in their choice of estimate $\hat{x}_t^i$. Thus at time t contestants will have observed $y_1, \ldots, y_{t-1}$ but $x_1, \ldots, x_{t-T}$ only. It is an assumption of this setup that, due to the decay in relevance of past $x_t$ values, they are forced to rely heavily on the actual noisy observations $y_t$.

In a variant of this setup participants are never shown the ground truth $x_t$ but rather a proxy $\tilde{x}_t$ that is a function of both past, present and future values of $y_t$, namely $y_{t-T}, \ldots, y_t+T$. They are asked to predict $\tilde{x}_t$ but also judged, e.g., privately, on their performance against $x_t$. The motivation for using $\tilde{x}_t$ is that in real world problems we don't have access to $x_t$.

The statistician is inviting the crowd to develop an approximate inference and estimation algorithm that will work on his problem of interest so long as his generative model is a good representation of reality. By outsourcing approximate inference our statistician is able to work, once again, at the level of a generative model.

Reasons to persist with generative modeling. There may be many reasons to persist with generative modeling. In the filtering example described above, the most accurate predictor of $y_t$ will not coincide with the best estimate of $x_t$ because the former will "chase" the predictable component of the error $\in_t$ whereas the latter will not. Yet the concrete application in mind might demand an estimate of $x_t$, not $y_t$. Examples include market making where $x_t$ is a price time series.

Additional criteria deemed beneficial might be built into the contest. An end user might be looking for a relatively smooth sequence of estimates of $y_t$ and, once again, the best predictive estimate of $y_t$ may chase too often. Smoothness might be built directly into the competition scoring and compensation, encouraging participants to trade off the dual objectives. The contestants' entries might be mapped to an efficient frontier where the compromise between smoothness and accuracy is made apparent and a partial, rather than total ordering is applied. This would enable the customer to select a representative set of dominating algorithms, some smooth and not quite as accurate, others very accurate but not so smooth.

Irrespective of the design details, the success of this method rests ultimately on the efficacy of the crowd and the algorithms they devise. Some contestants may be clever enough to reverse engineer the contest design and, by following steps 2 through 5 above, may arrive at highly efficient and accurate solutions. This possibility is good but far from necessary. It is likely that general purpose prediction algorithms will achieve excellent cross sectional performance in short time.

Figure 13:
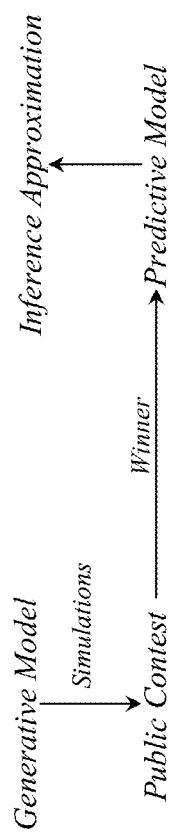
FIG. 13 illustrates an indirect approach for producing an inference model from a generative model according to an exemplary embodiment of the invention.

The indirect route from generative model to inference as described herein is represented in FIG. 13. FIG. 13 illustrates an indirect approach that avoids the hard work of producing an inference model from a generative model. The crowd competes in a family of prediction contests in which observations yt are supplied but ground truth targets xt are quarantined for many lags or withheld entirely In traditional historical contests it may be necessary to consider the ability to interpret predictive models. In the inference contest that consideration is generally not a concern. The generative model has already supplied the meaning.

As noted all this can be achieved without a single confidential data point ever being presented to the crowd. Being a special case of chumming, inference contests provide a safe means of outsourcing the hardest parts of modeling work without ever providing real commercial data to contest participants.

Figure 14:
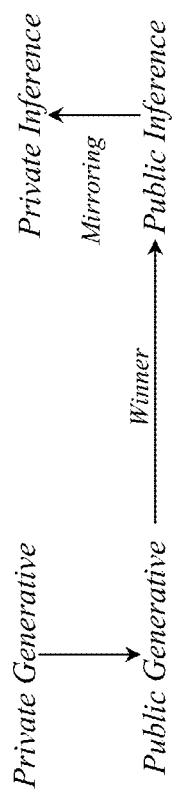
FIG. 14 illustrates a method in which public inference contests bait good approximate inference algorithms, according to an exemplary embodiment of the invention.

It may be important to design the contest in a way that forces contestants' models to work well for a suitable wide range of parameters. FIG. 14 illustrates a slightly different perspective on FIG. 13 in which public inference contests bait good approximate inference algorithms, which are simultaneously used on private data.

Boosting. The discussion above described the use of synthetic data contests as a means of attracting and short-listing algorithms that can then be applied to private data. A class of examples were described using data generated from batch algorithms in need of online approximation, and more specifically the use of generative time series models for evaluating inference algorithms. A broader example will now be described that relies on the possibility of efficiently teaching recruited algorithms by comparing their performance on public data and private data their authors never see.

Autonomy of algorithms. This discussion brings into focus the distinction between submitted algorithms that continue to learn and those which do not. For example the bulk of the model selection and estimation might be done offline by a human participant (or meta algorithm) and only the calibrated model submitted. Alternatively, a participant may submit a completely uncalibrated model that will, over time, slowly calibrate itself through the judicious storage of past data and periodic re-estimation, or else by other methods for effecting the same outcome.

A contest designer should be cognizant of the relative amount of upfront versus ongoing estimation likely to be performed by participants' bots. There are extremes at both ends of the spectrum. One competitor may submit a constant model for a contest in which a daily estimate of temperature is required, that is to say, for avoidance of doubt, a function whose body is a single line of code "return 27.3." The number might be valuable but the algorithm submitted clearly is not. Nonetheless the participant can push a new version of the code every day and win the contest, very much defeating the attempt by the sponsor to draw in algorithms that are reusable on private data.

It is conceivable that meta-contests can help delineate between algorithms that are learning and those whose performance is likely to degrade. That is, after all, part of the task assigned to the meta-contest participants and it may even be explicit in a feature. But again this depends on design details and what information is provided. There are also certain defenses against this kind of attack on a chumming contest, such as not allowing excessive numbers of code revisions to be pushed or, perhaps more usefully, discounting compensation earned in a public contest based in performance of the algorithms on private data. The latter involves some small conveyance of information about the private data back to participants. In practical circumstances this tiny leakage compares favorably with much more serious attrition risk in the in-house employment model.

There is a continuum between learning and non-learning algorithms. To borrow the model example from the discussion above on inference, a Kalman filter with fixed parameters might be considered non-learning, yet viewed in comparison with a moving average might be considered differently: an efficient means of learning weights on the fly. A long-short term memory neural network with fixed parameters operating on a long time window is also static, in the same sense, yet if one were to interpret those fixed weights carefully they may be seen to be implementing a combination of on the fly estimation and inference.

Learning at times may be at odds with other attempts to modify the pure, open use of real-time contests for contained, private or regulated use. For example, if submitted algorithms are tightly controlled and are not permitted to save state (for efficiency of deployment) or make any contact with the outside world (for instance to avoid any possibility of material non-public information being used) then learning may be difficult. On the other hand, contests may be designed to encourage learning, perhaps through the use of adversarial examples and game theoretic design of synthetic data. Additionally, there will be many incentives to create learning rather than non-learning algorithms. This reduces maintenance and thus lowers the break-even cost of entering a contest.

Moreover, learning algorithms can automatically enter contests, leading to further significant cost reduction for the end consumer of prediction. The vast majority of contests are likely to be populated by robos and sentinels as described above. A bot that autonomously enters a public contest and learns to compete effectively in the absence of human intervention faces no special challenge when immediately conscripted to run on private data. Nor will it be necessary for robos to learn private data patterns from scratch, since structure in imperfect public data can jump start learning on private data, and enable equivalent learning to occur on a private data set with reduced size.

Multi-task learning may be another driver of a prediction web where private use is important, and where low cost use drives adoption. Yet viewed this way, and predicated on sufficient incentive for the development and maintenance of highly effective multitask, few-shot and autonomous species, there may be no privacy issue. Data sensitivity issues only arise due to externalization of learning. With this caveat, we consider the chumming of non-learning algorithms that are trained by their authors on a public, synthetic data set and simultaneously evaluated on a private commercial data set.

A specific algorithm is described that iterates on the synthetic data presented to participants based on performance predicting private training data they are not privy to. This concept may be referred herein to as the "boosting" of a synthetic training set. Those uncomfortable with the appropriation of the term boosting might prefer to refer to this as "active chumming". A synthetic data generation method is a requisite, and some are considered in the discussion below.

Rank-boosting a synthetic training set. A method of boosting a synthetic training set for supervised learning described herein considers simultaneously the ranking of contestants' overall performance on the entire data set and the ranking of performance on a single data point. Consider point estimate contests in which synthetic training data is presented to participants. They are then judged against the private training data. Let $$\in_{ij} = \|f_i(x_j) - y_j\|$$

denote the i'th participant's prediction error for the j'th question whose solution is $y_j$. Let $F_j(\ )$ denote the empirical distribution function of the $\in_{ij}$ for fixed j as i varies. Then denote by $n_{ij} = F_j(\in_{ij})$ the distributional transform of these absolute errors. In a variant we can replace $n_{ij}$ with $\phi^{-1}(n_{ij})$ where $\phi$ is the standard normal distribution function.

Turning to the leaderboard we let $\bar{n}_i$ denote $\overline{F}(\overline{\in}_j)$, where this time we use the average overall error for the ith participant in place of the specific error for a given question.

Again we apply a distributional transform $\overline{F}(\ )$ this time for these average errors. This yields a single vector $\overline{\in}$.

For each synthetic training point j we can now compute the correlation $\rho_j$ between the transformed participant residuals $n_{ij}$ and the fixed vector n as i runs over the participants. An inner product may also suffice. This is a measure of how each public training data point reflects likely performance on the private leaderboard, and thus may separate "good" fake training data points from bad.

An iterative scheme for increasing the correlation between performance in public and private leaderboards may proceed by eliminating low correlation synthetic training points and regenerating more to take their place. To summarize: (1) simulate synthetic questions for a public contest using any means such as those discussed below (synthetic data); (2) based on private and public residuals, compute correlations $\rho_j$ for each public question as described; (3) discard questions whose $\rho_j$ values fall in the lowest percentile (or alternatively, below a fixed threshold) and generate new synthetic questions to replace them. The procedure may be applied to time series contests where many synthetic time series are generated using different meta-parameters. We terminate some time series and birth others. It is possible to design many variants on the scheme, such as by merging $\rho_j$ calculations into a Metropolis-Hastings algorithm or similar.

A simple thought experiment may illustrate why boosting might or might not work. Consider a trivial case where the true functional relationship between scalar x and scalar y is the identity map, and the domain is [0, 1]. The private training data, we shall presume, comprises eleven equally spaced questions and solutions $$T = \{(0,0), (0.1,0.1), \ldots, (1,1)\},$$

whereas the private validation data comprises $$V = \{(0.05,0.05), \ldots, (0.95,0.95)\}$$

Though this may not be the most inspired use of crowdsourcing, imagine that we wish to generate synthetic training data T' and then attract algorithms that perform well on V, because to supply T's y-values directly would violate confidentiality.

Further suppose that a Gaussian Copula approach is used to simulate synthetic training data T' as described below in the discussion of synthetic data. The precise result of this training set generation will depend on the manner in which margins and the correlation matrix are computed, but for simplicity of the thought experiment we will presume this amounts to the generation of a sequence of points (a, a+0.01 b) on demand where a is drawn uniformly and b is a small amount of random noise. The exact properties of the noise term b and its dependence on a won't really matter at the level of precision of this thought experiment.

Following the prescription for boosting, assume that a number of algorithms have been trained on this synthetic data set and then evaluated and ranked using T Suppose the models fall into two groups: linear regression and binary decision trees, the latter being mostly synonymous with monotonic piecewise constant functions unless the noise is very large or the trees over-fitted. Within each group, assume there are different meta-parameters and estimation methodologies, sufficiently diverse, for instance, to ensure that one of the calibrated regression estimates is almost precisely the identity map. This entry will top the leaderboard by construction.

The coarse trained regression trees should fall towards the bottom of the leaderboard, with performance varying based on the decision boundaries. If (0.28, 0.34) are the edges straddling 0.3 after one tree model is fit in the simulated data then the tree prediction on the same point 0.3 will be the arithmetic average of the y values of only those synthetic training points whose x coordinate falls between 0.28 and 0.34. Only by accident will this be close to 0.3. More likely it will be higher. Trees whose edges straddle the training data abscissa symmetrically will tend to outperform those that are unbalanced.

Considering both trees and linear models together the performance correlation p of each training point will depend on both the noise b and proximity to the validation set abscissa 0, 0.1, . . . 1.0. A training point with a large b value will penalize accurate models and reward half of the inaccurate models. It will therefore have a $\rho_j$ significantly less than 1. Conversely, training points with negligible b values will reward only the accurate models, leading to relatively higher $\rho_j$.

Consider also the choice of x-value in the synthetic training point. Here the relationship between $\rho_j$ and desirability of the training point is more subtle. One can see that synthetic training points like (0.09, 0.1) and (0.11, 0.1) might accidentally do a good job of training a tree model to hit the target (0.1, 0.1). Yet these points will penalize the accurate regression models. Therefore they may yield low $\rho_j$, assuming the latter are generally outperforming.

Should point (0.05, 0.05) that is far from the validation set T to be considered a "good" training point? If the intention of the exercise is to knock out the class of step functions in favor of linear functions, even though both can satisfy T, then it is a very good training point. If the linear functions are towards the top of the leader-board and the trees down the bottom, then (0.05, 0.05) will have a high $\rho_j$.

It is not clear from this example that the boosting algorithm will be particularly effective. If a collection of step functions dominate the upper echelons of the leader-board then points like (0.09, 0.1) and (0.11, 0.1) may actually record a high $\rho_j$, encouraging a cycle in which the training points T' achieved through boosting take on the collective appearance, at least locally to 0.1, 0.2 and so forth, of a step function. Models that are selected may not perform well on the validation set V at all. On the other hand if a healthier feedback sets in the contest will select mostly linear models, as desired.

It may be the case that boosted synthetic training data is superior to the original training data in a practical sense. In this scenario the points such as (0.05, 0.05) gain larger $\rho_j$ whereas those more easily fit by tree models, such as (0.09, 0.1) and (0.11, 0.1), are eliminated from the pool. Relative to T this will lead to overpopulation of synthetic data points in T' that are close to V, and in turn this might make the out of sample performance more robust to the class of models considered.

Synthetic data. In the discussion above on boosting, a means of generating synthetic training data T' with similar statistical properties to confidential data T was presupposed, so a discussion of how this may be achieved is warranted. A few examples are provided with the comment that because of the observations made above, and the likelihood of much cleverer approaches for active chumming being invented, there is no requirement that synthetic data be perfect.

Sampling with constraints. To make the discussion concrete, an algorithm for sampling random numbers subject to known linear and moment constraints is described. The motivation comes from derivative pricing where there may be attempts to calibrate a probabilistic model for an underlying random variable (such as a stock price) subject to known constraints (such as the price of an option on the same). Absent faster methods such as PDE or analytic solutions, one traditionally proceeds to draw samples from the probabilistic model for the purpose of pricing other securities. As an aside, the probabilistic model for this purpose would be under a pricing measure, and thus would not be intended to model real world probabilities.

observed prices→calibrated model→random sample

This has several advantages including the built in regularization obtained by using a parametrized model. There is a drawback however: one has to come up with the model, and the calibration scheme. To introduce the topic of synthetic data generation a more direct path can be used:

observed prices→random samples

A quasi-random sampling scheme can be used that automatically achieves the calibration while striving to retain smoothness of the distribution.

According to another embodiment, the term "herding" may refer to sampling data and coercing the empirical distribution of those samples towards desired properties. A relatively recent line of research in machine learning goes by that name (see Max Welling, Herding Dynamic Weights for Partially Observed Random Field Models, *Uai* 2009, pages 599-606, 2009; Max Welling, Herding dynamical weights to learn, *Proceedings of the 26th Annual International Conference on Machine Learning—ICML* 2009, pages 1-8, 2009).

Similar to the above example, herding creates quasi-random samples subject to constraints. If $X_i$ are discrete random variables and $X_a$ denotes a group whose cost relative to a desire moment is represented by $f_a$, then once gain we can choose random samples $X^{(1)}, \ldots, X^{(n)}$ sequentially. The next random sample can be chosen to-minimize a cost function representing weighted discrepancy across all the groups.

Formally, we might choose a new sample point $X_n$ to minimize $$l(X^{(1)}, \ldots, X^{(n)}) = \sum_i \sum_a w_a f(X_a^{(i)})$$

where $X^{(i)}$ represents the i'th quasi-random sample. This can be relatively efficient since the overall loss can be tracked by running totals for each group, just as in the previous example.

The particular case where the moments on groups represent n-margins, herding represents an approach to reconstruction of a joint distribution from lower dimensional projections (subject to the internal consistency of the n-margins themselves). It thereby hopes to address a generalization of the problem tackled by Copula theory, where only 1-margins are considered and 2-margins are used in calibration.

The herding approach to synthetic data generation in high dimensions may be summarized: (1) estimate low dimensional margins (e.g. 3-margins) based on the real dataset, for example by using the empirical distribution; (2) use herding to simulate the joint distribution.

Copulas. Copula theory, and in particular Sklar's Theorem, addresses the relationship between arbitrary joint distributions and joint distributions on the unit hypersphere. If $X=(X_1, \ldots, X_n)$ is a random vector with distribution function F and 1-margins $F_i$, $X_i \sim F_i$ then we say C is a Copula function if $$F(X)=C(F_i(X_1),\ldots,F_n(X_n))$$

Sklar's theorem asserts the existence of C, leading to a methodology for modeling any random vector wherein the margins are estimated separately from the Copula function. Several families of parameterized Copula functions exist and can be exploited for this purpose.

A popular choice is the Gaussian Copula, made notorious during the global financial crisis. Simulation of synthetic data using a Gaussian Copula proceeds by first simulating a multivariate Gaussian vector Z and then applying a composition of a normal distributional transform to each margin (converting them to uniform) followed by the inverse distributional transform of the margin. Thus:

$$X_k = F_i^{-1} \cdot \Phi(Z_k)$$

is the i'th coordinate of the simulated data point X when $Z_k$ is drawn from a multivariate Gaussian random number generator. The covariance or correlation matrix of Z parametrizes the choice of Copula, whereas the $F_i$ parametrize the margins.

In some implementations the Gaussian Copula approach is philosophically similar to the herding approach:

1. Estimate low dimensional margins (specifically 2-margins) based on the real dataset, subject to the constraint that the 2-margins take the dependency structure imposed by the Normal Copula. The estimation can take place after coordinates are transformed in such a way as to make their margins normal.

2. Simulate the joint distribution using the previous equation $(X_k=F_i^{-1}\cdot\Phi)(Z_k))$ It is simpler to estimate, but imposes some assumptions about the data that might not be accurate. Not every multivariate random variable with normal 1-margins is a multivariate Gaussian random variable.

Advances in machine learning techniques present many new approaches for the simulation of synthetic data. Autoencoding can be used to reduce synthetic data to a more convenient problem on code space.

Generative adversarial networks have proven extremely popular and may be implemented as adversarial contests. According to this embodiment, a method for estimating generative models can be implemented that uses an adversarial process in which two models are trained simultaneously: a generative model G that captures the data distribution, and a discriminative model D that estimates the probability that a sample came from the training data rather than G.

The training procedure for G is to maximize the probability of D making a mistake. This framework corresponds to a minimax two-player game. The generative model G is pitted against an adversary: a discriminative model that learns to determine whether a sample is from the model distribution or the data distribution. The generative model can be considered as trying to produce fake data and use it without detection. The discriminative model can be thought of as trying to detect the fake data. Competition in this game drives both teams to improve their methods until the fake data is indistinguishable from the real data.

In the space of arbitrary functions G and D, a unique solution exists, with G recovering the training data distribution and D equal to ½ everywhere. In the case where G and D are defined by mutilayer perceptrons, the entire system can be trained with backpropagation. There is no need for any Markov chains or unrolled approximate inference networks during either training or generation of samples.

The adversarial modeling framework is preferably applied with both models comprising multilayer perceptrons. To learn the generator's distribution $p_g$ over data x, we can define a prior on input noise variables $p_z(z)$, then represent a mapping to data space as $G(z; \theta_g)$, where is a differentiable function represented by a multilayer perceptron with parameters $\theta_g$. We also define a second multilayer perceptron $D(x; \theta_d)$ that outputs a single scalar. $D(x)$ represents the probability that x came from the data rather than $p_g$. We train D to maximize the probability of assigning the correct label to both training examples and samples from G. We simultaneously train G to minimize $\log(1-D(G(z)))$. Additional details can be found at Ian J. Goodfellow et al., Generative Adversarial Nets, arXiv:1406.2661v1 [stat.ML] (Jun. 10, 2014).

Corporate bond trading. We have enumerated areas where real-time decision making can make use of crowd-sourced algorithms and data. In this section we take a deeper dive into specific applications, highlighting examples of the use of multiple related contests to achieve a business objective without sacrificing commercial data advantages.

Certain financial institutions provides liquidity to clients wishing to buy and sell corporate bonds. This example focuses on better predictions of features of the bond market that economists typically refer to as microstructure, e.g., the details of how trading takes place. Some of the picture is essentially public information because the self-regulatory body FINRA mandates the reporting of trades performed by its members to a central record known as TRACE. This record is disseminated at a trade level with only minimal obfuscation. See http://finra-markets.morningstar.com/BondCenter.

The way the corporate bond market operates is unlike stock trading. Rather than clearing orders on a central limit order book, trading in corporate bonds resembles a sealed bid auctions. A client wishing to trade will usually indicate interest to several dealers (by means of a "request for quote" known as an RFQ). Based on the prices offered in response, the client will then choose which dealer to transact with.

Optimizing a broker dealer's bond trading operation therefore amounts to optimizing the response to RFQs. There is theory around the best way to do this, but that theory requires econometric forecasts of key market metrics:

1. Increasing the accuracy of forecasts that feed into RFQ responses that are hypothetically optimal within a stylized model of market making. These include volatility, imbalance, typical markups and typical time between trading opportunities.

2. Conditional contests in which participants predict the outcomes of, hypothetical policy decisions—that is, crowdsourcing the advantage function.

3. Combinations of the two leveraging the close interplay between reinforcement learning techniques and design of combinations of real-time contests, as already discussed.

Thus the approach taken may be multi-faceted insofar as it involves a combination of internal and external contests.

According to one example, participants in the family of bond contests may be greeted as follows: Welcome to the bond prediction contest. You will be asked to create an algorithm that responds, within one second, to a highly specific question about the future trading activity in a particular corporate bond.

The question payload will include historical trading in the bond in question, historical trading in some related bonds issued by the same company, and miscellaneous attribute data such as the time to maturity of the bond, the coupon, whether the bond is callable. Those attributes are detailed in a data guide and their use illustrated in some template algorithms you are welcome to clone.

We invite you to use your imagination when it comes to finding relevant public contests on our site that might help predict bond prices. Examples may include changes in the stock price or options issued by the company, mentions of the company in the news, and fixed income trading holidays. Further discussion is left to the contest forum.

Furthermore, the specific contest pages may also provide specialized instruction describing the parameters of the question they should expect. For example:

You will be asked to predict the total trading volume in a bond with identifier I over the next T business days, counting only trades whose side is S, whose reporting party type is R, and whose contra party type is C.

Explanations of the question parameters and interpretation for a bond volume prediction contest may be provided as illustrated in FIG. 15. A template solution may be provided indicating the signature of the function the contestants are required to supply. The arguments to that function were I, T, S, R and C with meaning also giving in FIG. 15.

FIG. 16 lists some other low sensitivity contests that can be run using the essentially public FINRA TRACE record as a means of defining question payloads and solutions. FIG. 16 shows an example of a listing of contests, relative commercial sensitivity of the data streams involved, and techniques employed.

Question payload. An example of a listing of trades of a corporate bond is provided in FIG. 17 (FINRA TRACE reporting of corporate bond trades). The question payload can be built on this history by including generalized lags of the full TRACE history for all bonds from the same issuer. The details of the lag generation are quite complex and can be provided to the participants inline. The code for efficient generation of these lags can also be provided to participants so that they might better understand the construction.

As described above, exemplary embodiments of the invention can provide many advantages to data consumers. For example, real-time contests are reusable, as one contest can be used as a regressor for another. The immediate utility of a large array of interrelated, bi-temporally indexed random variables is clear.

Another advantage is timeliness. Real-time contests combat the problem of timeliness, also identified as an important limitation of historical contests. Today companies place emphasis on near real-time business intelligence and the data acquisition required for the same. The creation time for a new collection of nodes on our lattice dictated by the amount of time it takes to accumulate enough data for participants to build reliable models, and then the time it takes to differentiate contestants. This compares favorably with typical time to market for quantitative models. Moreover once created, a contest can maintain its statistical relevance.

Contestants are on the hook for that and must remain near the top of the leader-board to continue to be paid. So whereas the common task framework is primarily a research tool wielded within the existing in-house commercial paradigm (with a long time to market and substantial separation between research and production code), real-time contests can play a direct and ongoing role in production provided there are enough submissions to guarantee a continued, fierce battle for relevance.

Furthermore, out of the never-ending competition comes stability through redundancy, a very different approach to the usual software development life cycle and other controls used in the industry. Most industry calculations rely on a brittle chain of calculations with many points of failure.

Ease of specification is another advantage. Any person can establish a contest. That is because any source of updating data, such as might be available on a table in a web page or a public JSON page, is already close to being a specification of a real-time forecasting contest. The remaining details can be handled by a straightforward dialog.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network 110 in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network 110 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of servers 120, 142, 146, 162, 166 and personal computing devices 122, 124, 140, 144, 160, 164 are shown in FIG. 1, exemplary embodiments of the invention may utilize other types of communication devices whereby a user may interact with a network that transmits and delivers data and information used by the various systems and methods described herein. The personal computing devices 122, 124, 140, 144, 160, 164 may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices 122, 124, 140, 144, 160, 164 may include various connections such as a cell phone connection, WiFi connection, Bluetooth connection, satellite network connection, and/or near field communication (NFC) connection, for example.

As described above, FIG. 1 includes a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices 122, 124, 140, 144, 160, 164. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented system for providing data science as a service (DSaaS) using a data prediction contest, the system comprising:
    a memory; and
    a computer processor that is programmed to:
        execute a data prediction contest, the data prediction contest being conducted in real time or near real time and is machine-readable to enable software robots to be participants in the data prediction contest, participants in the data prediction contest are permitted to execute and submit algorithms, utilize third party data sources, and utilize sub-contests to generate data predictions for the data prediction contest, and wherein a category of sponsor confidential information is defined with respect to a category of confidential information of the sponsor related to the data prediction;
    execute a sub-contest to predict a participant's residuals wherein the sub-contest is created by the participant;
    maintain the confidentiality of the sponsor confidential information; receive data predictions from the participants on a real time or near real time basis;
    calculate a score for the data predictions received from participants; and
    compensate participants according to the score of their data predictions,
    wherein prize-money for the sub-contest is assigned by the participant to be equal to a fraction of the participant's ongoing compensation in the data prediction contest to permit the participant to fragment a task in different ways according to one or more objectives and constraints of the participant.

2. The system of claim 1, wherein the computer processor is programmed to request prediction of a public variable that serves as a proxy for a private variable maintained as sponsor confidential information by the sponsor of the data prediction contest.

3. The system of claim 2, wherein a variation of the public variable that is the subject of the data contest is causally related to a variation of the private variable maintained as sponsor confidential information.

4. The system of claim 1, the computer processor being further programmed to transmit a subset of a data stream to participants of the data prediction contest such that participants do not receive a complete data stream, thereby preventing use of the complete data stream for purposes other than participation by the participant in the data prediction contest.

5. The system of claim 1, wherein the computer processor is further programmed to transmit a data stream to participants of the data prediction contest; and introduce traceable changes to the data stream to enable investigation of use of the data stream by participants for purposes other than participation in the data prediction contest.

6. The system of claim 1, the computer processor being further programmed to execute a discriminator contest to distinguish fake data from real data.

7. The system of claim 1, the computer processor being further programmed to estimate a generative model using an adversarial process in which two models are trained: a generative model G that captures a data distribution, and a discriminative model D that estimates a probability that a sample came from training data rather than the generative model G.

8. The system of claim 1, the computer processor being further programmed to require participants in the data prediction contest to agree to cloning of their submitted algorithms to enable the sponsor to use their submitted algorithms on private data without sponsor confidential information being disclosed to the participants.

9. The system of claim 1, the computer processor being further programmed to: use a generative model to populate a family of real-time data prediction contests; conduct a plurality of public real time data prediction contests in which observations are supplied but sponsor confidential information comprising ground truth targets are withheld; receive predictive models from the participants; use the predictive models as inference approximations.

10. A computer-implemented method for providing data science as a service (DSaaS) using a data prediction contest, the method comprising:
    executing a data prediction contest using a computer processor, the data prediction contest being conducted in real time or near real time and is machine-readable to enable software robots to be participants in the data prediction contest, participants in the data prediction contest are permitted to execute and submit algorithms, utilize third party data sources, and utilize sub-contests to generate data predictions for the data prediction contest, and wherein a category of sponsor confidential information is defined with respect to a category of confidential information of the sponsor related to the data prediction;
    executing a sub-contest to predict a participant's residuals wherein the sub-contest is created by the participant;
    maintaining the confidentiality of the sponsor confidential information;
    receiving data predictions from the participants on a real time or near real time basis;
    calculating a score for the data predictions received from participants; and
    compensating participants according to the score of their data predictions,
    wherein prize-money for the sub-contest is assigned by the participant to be equal to a fraction of the participant's ongoing compensation in the data prediction contest to permit the participant to fragment a task in different ways according to one or more objectives and constraints of the participant.

11. The method of claim 10, further comprising the step of: requesting prediction of a public variable that serves as a proxy for a private variable maintained as sponsor confidential information by the sponsor of the data prediction contest.

12. The method of claim 11, wherein a variation of the public variable that is the subject of the data contest is causally related to a variation of the private variable maintained as sponsor confidential information.

13. The method of claim 10, further comprising the step of:
transmitting a subset of a data stream to participants of the data prediction contest such that participants do not receive a complete data stream, thereby preventing use of the complete data stream for purposes other than participation by the participant in the data prediction contest.

14. The method of claim 10, further comprising the steps of: transmitting a data stream to participants of the data prediction contest; and introducing traceable changes to the data stream to enable investigation of use of the data stream by participants for purposes other than participation in the data prediction contest.

15. The method of claim 10, further comprising the step of executing a discriminator contest to distinguish fake data from real data.

16. The method of claim 10, further comprising the step of:
estimating a generative model using an adversarial process in which two models are trained:
a generative model G that captures a data distribution, and
a discriminative model D that estimates a probability that a sample came from training data rather than the generative model G.

17. The method of claim 10 further comprising the step of:
requiring participants in the data prediction contest to agree to cloning of their submitted algorithms to enable the sponsor to use their submitted algorithms on private data without sponsor confidential information being disclosed to the participants.

18. The method of claim 10, further comprising the step of:
using a generative model to populate a family of real-time data prediction contests;
conducting a plurality of public real time data prediction contests in which observations are supplied but sponsor confidential information comprising ground truth targets are withheld;
receiving predictive models from the participants; and
using the predictive models as inference approximations.

* * * * *